US007072362B2

(12) United States Patent
Tsunoda et al.

(10) Patent No.: US 7,072,362 B2
(45) Date of Patent: Jul. 4, 2006

(54) REAL TIME COMMUNICATIONS OF MUSICAL TONE INFORMATION

(75) Inventors: Shigeo Tsunoda, Hamamatsu (JP); Satoru Motoyama, Hamamatsu (JP); Yutaka Hasegawa, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 505 days.

(21) Appl. No.: 09/897,691

(22) Filed: Jun. 29, 2001

(65) Prior Publication Data

US 2002/0027910 A1 Mar. 7, 2002

Related U.S. Application Data

(62) Division of application No. 08/998,209, filed on Dec. 24, 1997, now Pat. No. 6,574,243.

(30) Foreign Application Priority Data

Dec. 27, 1996 (JP) .............................................. 8-349939
Mar. 13, 1997 (JP) .............................................. 9-59600

(51) Int. Cl.

| | |
|---|---|
| ***H04J 3/18*** | (2006.01) |
| ***H04J 3/00*** | (2006.01) |
| ***H04J 3/06*** | (2006.01) |
| ***H04J 1/00*** | (2006.01) |

(52) U.S. Cl. ....................... 370/476; 370/477; 370/503; 370/487

(58) Field of Classification Search ................. 370/470, 370/471, 473, 474, 475, 476, 477, 401, 352, 370/350, 503, 507, 510, 512, 513, 514; 84/602, 84/604, 609–614, 601; 709/231, 236, 219
See application file for complete search history.

(56) References Cited

U.S. PATENT DOCUMENTS

| | | | | | |
|---|---|---|---|---|---|
| 5,248,842 | A | * | 9/1993 | Saito | 84/602 |
| 5,257,259 | A | | 10/1993 | Tsurumi | |
| 5,313,011 | A | * | 5/1994 | Koguchi | 84/609 |
| 5,325,423 | A | | 6/1994 | Lewis | |
| 5,335,073 | A | | 8/1994 | Yamamoto | |
| 5,535,224 | A | | 7/1996 | Kondo et al. | |
| 5,544,228 | A | | 8/1996 | Wagner et al. | |
| 5,574,949 | A | | 11/1996 | Tsurumi | |
| 5,768,350 | A | | 6/1998 | Venkatakrishnan | |
| 5,810,603 | A | | 9/1998 | Kato et al. | |
| 5,880,386 | A | * | 3/1999 | Wachi et al. | 84/601 |

(Continued)

FOREIGN PATENT DOCUMENTS

| | | |
|---|---|---|
| DE | 43 26 789 A1 | 2/1995 |
| DE | 43 26 789 | 2/1995 |
| EP | 0 531 670 | 7/1992 |
| EP | 0 531 670 A1 | 3/1993 |
| JP | 4-18835 | 1/1992 |
| JP | 06-044155 | 7/1992 |
| JP | 04-316294 | 11/1992 |
| JP | 07-152668 | 11/1993 |
| JP | 06-351006 | 12/1994 |
| JP | 7-64579 | 3/1995 |
| JP | 07-123132 | 5/1995 |
| JP | 08-110777 A | 4/1996 |
| JP | 08-289251 | 11/1996 |

*Primary Examiner*—Hanh Nguyen
(74) *Attorney, Agent, or Firm*—Morrison & Foersterm LLP

(57) ABSTRACT

A musical tone data communications system having a unit for generating MIDI data of a musical performance by a player, a unit for transmitting the generated MIDI data over a communications network and a unit for receiving the transmitted MIDI data and reproducing musical tones corresponding to the MIDI data in real time.

47 Claims, 16 Drawing Sheets

U.S. PATENT DOCUMENTS

| | | | | | |
|---|---|---|---|---|---|
| 5,883,957 | A | | 3/1999 | Moline et al. | |
| 5,886,274 | A | * | 3/1999 | Jungleib | 84/601 |
| 5,899,699 | A | | 5/1999 | Kamiya | |
| 5,900,567 | A | * | 5/1999 | Fay et al. | 84/613 |
| 5,967,792 | A | | 10/1999 | Matsumoto | |
| 5,982,816 | A | | 11/1999 | Ogita et al. | |
| 5,983,280 | A | | 11/1999 | Hunt | |
| 5,986,201 | A | | 11/1999 | Starr et al. | |
| 6,053,740 | A | | 4/2000 | Nakata et al. | |
| 6,067,566 | A | | 5/2000 | Moline | |
| 6,151,634 | A | * | 11/2000 | Glaser et al. | 709/236 |
| 6,288,991 | B1 | * | 9/2001 | Kajiyama et al. | 369/47.23 |
| 6,574,243 | B1 | * | 6/2003 | Tsunoda et al. | 370/476 |

* cited by examiner

REAL TIME COMMUNICATIONS OF MUSICAL TONE INFORMATION

This is a division of U.S. patent application Ser. No. 08/998,209 filed Dec. 24, 1997 now U.S. Pat. No. 6,574,243.

This application is based on Japanese Patent Applications No. 8-349939 filed on Dec. 27, 1996 and No. 9-059600 filed on Mar. 13, 1997, the entire contents of which are incorporated herein by reference.

BACKGROUND OF THE INVENTION a) Field of the Invention

The present invention relates to data communications technologies, and more particularly to real time data communications technologies. A "real time" response to an event is essentially simultaneous with the event itself. However, in communications, because of time delay for transmission time, signal synchronization, other necessary signal process or the like, "real time" does not mean strictly simultaneous.

b) Description of the Related Art

As a standard specification for communications between electronic musical instruments, a music instrumental digital interface (MIDI) specification is known. Electronic musical instruments equipped with interfaces of the MIDI specification can communicate with each other by transferring MIDI data via a MIDI cable.

For example, an electronic musical instrument transmits MIDI data of a musical performance by a player, and another musical instrument receives it to reproduce it. As one electronic musical instrument is played, another electronic musical instrument can be played in real time.

In a communications network interconnecting a plurality of general computers, various types of data are transferred. For example, live musical tone data or other MIDI data can be transmitted from one computer, which once stored the data in its storage device such as a hard disk, via the communications network to another computer which stores the received data in its storage device. A general communications network is, however, configured to perform only general data communications, and is not configured to properly process MIDI data.

Specifically, although the MIDI specification allows the "real time" communications to be performed between electronic musical instruments, it is not suitable for long distance communications and communications via a number of nodes. The general communications network is essentially configured to provide services of long distance communications and multiple-node communications, but it does not take account of "real time" communications between electronic musical instruments.

Real time communications of musical information uses a large amount of information per unit time, and the traffic of the communications line becomes heavy. As compared to point-to-point communications, point-to-multipoint communications of musical tone data is more likely to make the traffic of communications lines heavy. The heavy traffic of communications lines generates a transmission delay and hinders a real time musical performance.

SUMMARY OF THE INVENTION

It is an object of the present invention to provide technologies of musical tone data communications capable of a real time musical performance at multiple nodes.

It is another object of the present invention to provide technologies of data communications capable of avoiding a heavy traffic of communications lines.

According to one aspect of the present invention, there is provided a musical tone data communications system, comprising: transmitting means for transmitting inputted MIDI data in real time over a communication network.

According to another aspect of the present invention, there is provided a data communications system comprising: receiving means for receiving data; access checking means for checking the number of communications lines accessed externally; and transmitting means capable of reducing the amount of data received by the receiving means in accordance with the number of communications lines accessed externally, and transmitting the reduced data to the communications lines accessed externally.

If the number of accessed communications lines is large, the amount of received data is reduced to thereby alleviate the traffic congestion, whereas if the number of accessed communications lines is small, it is not always necessary to reduce the data amount.

According to a further aspect of the present invention, there is provided a communication system having a plurality of communications apparatuses each having receiving means and transmitting means, wherein: the receiving means of the plurality of communications apparatuses receive the same data; the transmitting means of the plurality of communications apparatuses can reduce the amount of data received by the receiving means and can transmit the reduced data; and the data reduced by one of the communications apparatuses is different from the data reduced by another of the communications apparatuses.

Since the data reduced by one and another of communications apparatuses is different, the quality of data transmitted from each communication apparatus is different. For example, the type or reduction factor of the reduced data may be made different at each communication apparatus. Therefore, a user can obtain data of a desired quality by accessing a proper communication apparatus.

According to still another aspect of the invention, there is provided a musical tone data communications method comprising the steps of: (a) transmitting MIDI data over a communications network; and (b) receiving the transmitted MIDI data and supplying the received MIDI data to a tone generator in real time.

MIDI data can be transmitted to a number of nodes by using a communications network. At each node, the MIDI data is reproduced in real time to generate musical tones.

According to still another aspect of the invention, there is provided a musical tone data communications method comprising the steps of: (a) transmitting MIDI data; and (b) transmitting recovery data after the MIDI data is transmitted, the recovery data indicating a continuation of transmission of the MIDI data.

If there is no communications error, transmitted MIDI data can be correctly received at a partner communications apparatus. If there is a communications error, transmitted MIDI data cannot be correctly received at a partner communications apparatus. Even in such a case, the communication error can be remedied by transmitting the recovery data.

DETAILED DESCRIPTION OF THE PREFERRED EMBODIMENTS

Figure 1:
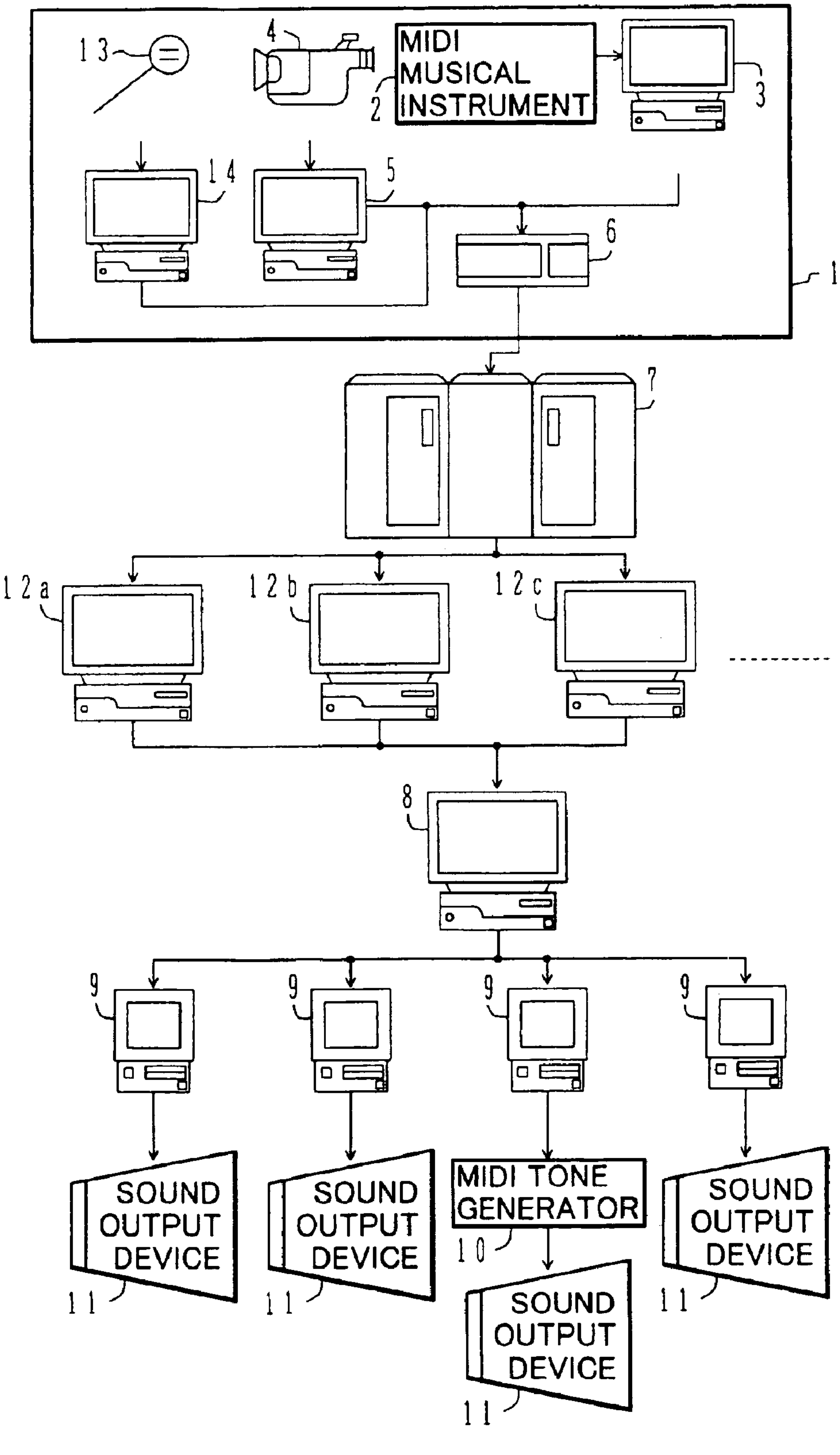
FIG. 1 is a schematic diagram showing a musical tone data communications network.

FIG. 1 shows a musical tone data communications network.

A concert hall 1 is installed with a MIDI musical instrument 2, a camera 4, encoders 3 and 5, and a rooter 6. A player plays the MIDI musical instrument 2 in the concert hall 1. The MIDI musical instrument 2 is an electronic musical instrument having a MIDI interface, generates MIDI data in real time in accordance with the performance by a player, and supplies it to the encoder 3. The encoder 3 transmits each packet of MIDI data of a predetermined format in real time to the Internet via the rooter 6. The data format will be later described with reference to FIG. 4.

The camera 4 takes an image of a player and supplies it as image data to the encoder 5. The encoder 5 transmits each packet of image data of a predetermined format to the Internet via the rooter 6. A microphone 13 samples sounds of a vocal (voice data), an acoustic musical instrument (for example a piano), or an electric musical instrument, and supplies these sample data to an encoder 14 as sound data. The encoder 14 transmits each packet of sound data of a predetermined format to the Internet via the rooter 6. The data format will be later described with reference to FIG. 4.

The rooter 6 transmits MIDI data and image data to the Internet to be described hereinunder. The data is supplied from the rooter 6 to a main server 7 via a public telephone line or a leased telephone line, and to a plurality of proxity servers 12*a*, 12*bj*, 12*c*, . . . and farther to a world wide web (WWW) server 8 which is called a provider.

The proxity servers 12*a*, 12*b*, 12*c* . . . are hereinafter called a proxity server 12 singularly or collectively. The proxity server 12 functions to avoid the traffic congestion of communications lines. The proxity server 12 controls the amount of data supplied from the main server 7 in accordance with the traffic conditions of communications lines and supplies the reduced data to the WWW server 8. For example, if the number of users (lines) is large, it is judged that the communications lines are congested, and the data is thinned to reduce the data amount and avoid the traffic congestion.

A plurality of proxity servers 12*a*, 12*b*, 12*c*, . . . may have different data reduction amounts or different data reducing methods. The data reduction amount influences the sound and image qualities. The larger the data reduction amount, the lower the sound and image qualities.

Fog example, the proxity server 12*a* may limit the number of accessible users to improve the sound and image qualities, whereas another proxity server 12*c* may lower the sound and image qualities to increase the number of accessible users. Such a function of the proxity server 12 can alleviate the traffic congestion of communications lines.

A user can access the Internet by connecting its home computer 9 to the WWW server 8 to receive MIDI data and image data in real time. The term “home computer” used herein is intended to mean any computer used for “home” concert as opposed to a remote concert hall. The home computer 9 has a display device for the display of image data and an external or built-in MIDI tone generator (sound source) for the generation of musical tone signals. The MIDI tone generator generates musical tone signals in accordance with MIDI data, and supplies the tone signals to a sound output device 11. The sound output device 11 has a D/A converter, an amplifier and a speaker to reproduce sounds in accordance with the supplied tone signals. Sound data is reproduced, converted from an analog form to an digital form, amplified by an amplifier, and reproduced as sounds from a speaker. Sounds same as those produced in the concert hall 1 can be reproduced from the sound output device 11 in real time.

If an external MIDI tone generator 10 is used, the home computer 9 makes the MIDI generator 10 generate musical tone signals and the sound output device 11 reproduce sounds.

Since the MIDI data and sound data are more important for a user than image data, the MIDI data and sound data are processed with a priority over the image data. Although a user does not feel uneasy about the image data with poor image quality and smaller frame number, sound information and musical tone information of MIDI data is required to have a high quality.

Any user can listen to a musical performance in real time by connecting the home computer 9 to the Internet while looking at each scene of the concert hall 1 on the display device at home without going to the concert hall 1. A number of users can enjoy at home the musical performance played in the remote concert hall. MIDI data is transmitted from the concert hall 1 to each user so that each user can share a situation of the concert hall 1 as if the player is playing the electronic musical instrument at user home.

The promoter of a concert determines a prescribed number of the concert and sells tickets to users. Tickets may have ranks such as rank A (special seat), rank B (ordinary seat) and rank C (gallery). For example, a user with a rank A ticket can access the proxity server 12*a* for the reception of high quality sound and image information, a user with a rank B ticket can access the proxity server 12*b* for the reception of sound and image information with a reduced data amount, and a user with a rank C ticket can access the proxity server 12*c* for the reception of only sound information with a reduced data amount.

Since not live musical tone information but MIDI data is transmitted over the Internet, the sound quality is not degraded by noises. However, since long distance communications via a number of communications sites is performed over the Internet, the following method of dealing with communications errors becomes necessary when data is transmitted from the encoders 3 and 5 and when the data is received at the home computer 9. For example, communications errors include data change, data loss, data duplication, data sequence change and the like.

Figure 2:
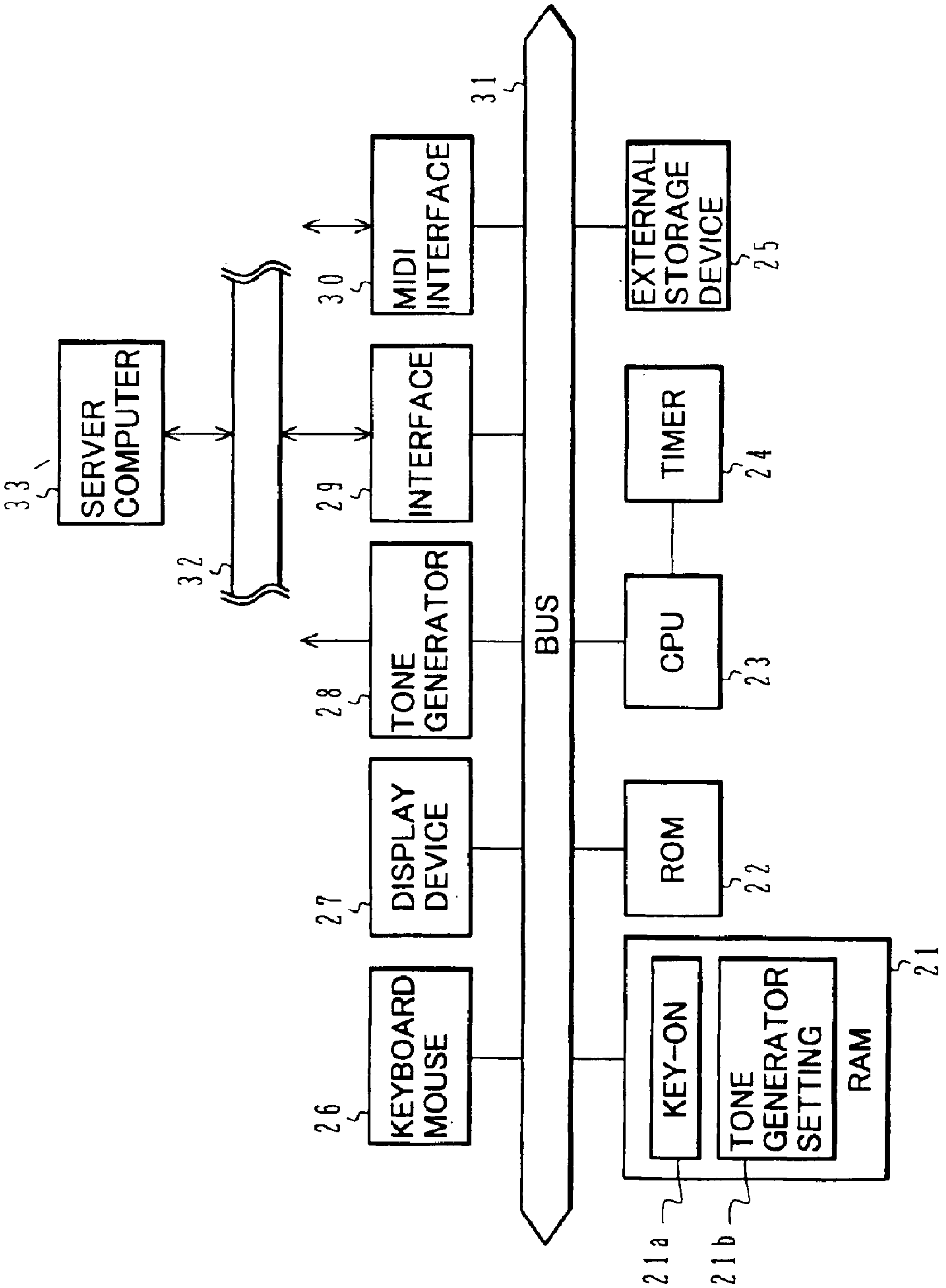
FIG. 2 is a block diagram showing the hardware structure of an encoder and a home computer.

FIG. 2 shows the hardware structure of the encoders 3 and 5 and the home computer 9 which may be a general computer.

Connected to a bus 31 are an input device 26 such as a keyboard and a mouse, a display device 27, a MIDI tone generator 28, a communications interface 29 for connection to the Internet, a MIDI interface 30, a RAM 21, a ROM 22, a CPU 23, and an external storage device 25.

Various instructions can be entered from the input device 26. In the home computer 9, the display device 27 displays each scene of a concert hall, and the MIDI tone generator 28 generates musical tone signals in accordance with received MIDI data and transmits them to an external circuitry.

The communications interface 29 is used for transferring MIDI data and image data to and from the Internet. The MIDI interface 30 is used for transferring MIDI data to and from an external circuitry.

The external storage device 25 may be a hard disk drive, a floppy disk drive, a CD-ROM drive, a magneto-optical disk drive or the like and may store therein MIDI data, image data, computer programs and the like.

ROM 22 may store therein computer programs, various parameters and the like. RAM 21 has a key-on buffer 21*a* and a tone generator setting buffer 21*b*. The key-on buffer 21*a* stores a key-on event contained in MIDI data, and the tone generator setting buffer 21*b* stores tone generator setting data contained in MIDI data.

RAM 21 has also working areas such as buffers and registers to copy and store data in ROM 22 and the external storage device 25. In accordance with computer programs stored in ROM 22 or RAM 21, CPU 23 performs various calculations and signal processing. CPU 23 can fetch timing information from a timer 24.

The external storage device 25 may be a hard disk drive (HDD). HDD 25 may store therein various data such as application program data and MIDI data. If a necessary application program is stored not in ROM 22 but in a hard disk loaded in HDD 25, this program is read into RAM 21 so that CPU 23 can run this application program in the similar manner as if the program is stored in ROM 22. In this case, addition, version-up and the like of an application program become easy. The external storage device 25 includes HDD and a CD-ROM (compact-disk—read-only-memory) drive which can read various data such as application programs stored in a CD-ROM. The read data such as an application program is stored in a hard disk loaded in HDD. Installation, version-up and the like of an application program become easy. Other types of drives such as a floppy disk drive, a magneto-optical (MO) disk drive may be used as the external storage device 25.

The communications interface 29 is connected to a communications network 32 such as the Internet, a local area network (LAN) and a telephone line, and via the communications network 32 to a server computer 33. If application programs and data are not stored in a hard disk loaded in HDD 25, these programs and data can be downloaded from the server computer 33. In this case, a client such as the encoder 3, 5 and home computer 9 transmits a command for downloading an application program or data to the server computer 33 via the communications interface 29 and communications network 32. Upon reception of this command, the server computer 33 supplies the requested application program or data to the client via the communications network 32 which client receives it via the communications interface 29 and stores it in a hard disk loaded in HDD 25.

This embodiment may be reduced into practice by a commercially available personal computer installed with application programs and various data realizing the functions of the embodiment. The application programs and various data may be supplied to a user in the form of a storage medium such as a CD-ROM and a floppy disk which the personal computer can read. If the personal computer is connected to the communications network such as the Internet, a LAN and a telephone line, the application programs and various data may be supplied to the personal computer via the communications network.

Figure 3:
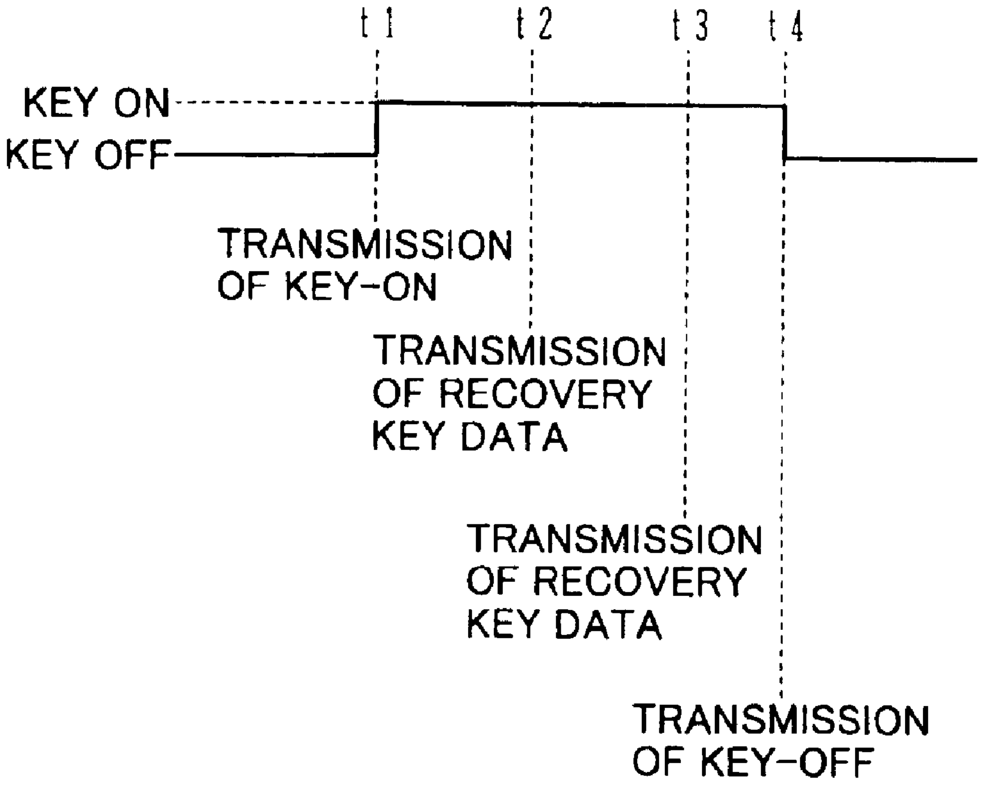
FIG. 3 is a timing chart illustrating a method of dealing with MIDI data communications errors.

FIG. 3 is a diagram illustrating a method of dealing with communications errors of MIDI data, indicating a key-on event at a high level and a key-off event at a low level by way of example.

In this example, a key-on event is transmitted at a timing t1 and a key-off event is transmitted at a timing t4. The key-on event transmitted at the timing t1 may be lost in some case by communications errors. In such a case, the home computer 9 on the reception side cannot receive the key-on event and receives only the key-off event so that a correct musical performance cannot be reproduced. The reception of only the key-off event without the key-on event will not occur according to the musical performance rule.

In order to avoid such a case, during the period after the transmission of the key-on event at the timing t1 and before the transmission of the key-off event at the timing t4, recovery key data is transmitted periodically at a predetermined time interval, in this example, at timings t2 and t3.

The recovery key-on data is confirmation data which notifies the reception side of a continuation of a key-on state. Even if the key-on event cannot be received at the timing t1, the key-on event is enabled when the recovery key data is received at the timing t2 although there is some delay from the timing t1. Similarly, even if the key-on event cannot be received both at the timings t1 and t2, it is enabled at the timing t3 when the recovery data is received.

Generally, a musical tone signal attenuates with time. It is therefore preferable to transmit the recovery key data with the information of a lowered velocity (sound volume) corresponding to the time lapse. The velocity information is always contained in the key-on event and transmitted together with the key-on event. In this example, key-on events (recovery key data) with gradually lowered velocities in the order of timings t1, t2 and t3 are transmitted.

A communications error of a key-on event can therefore be remedied by the recovery key data. A recovery method to be used when the key-off event at the timing t4 is lost will be described next.

It is possible to transmit key-off recovery data after the key-off event, similar to the recovery method for the key-on event. However, the time duration of a key-off is much longer than that of a key-on of each key of the keyboard. If the recovery key data is transmitted after the key-off event until the next key-on event occurs, the amount of this recovery key data becomes bulky.

The recovery key data for the key-on event is transmitted during the period after the key-on timing t1 and before the key-off timing t4, and is not transmitted after the key-off timing t4. That the recovery key data is not transmitted means that a key-off event has already occurred. Therefore, if the home computer 9 cannot receive the key-off event at the timing t4 but can detect that the recovery key data is not periodically transmitted, it is judged that the key state is presently a key-off.

If the recovery key data cannot be received periodically during the key-on, the home computer 9 can judge that there was a communications error, and enables the key-off so that a false continuation of sound reproduction can be avoided. This judgement is made by referring to the key-on buffer 21*a* shown in FIG. 2, and the details thereof will be later described with reference to a flow chart.

Similar to the key-on and key-off recovery, recovery tone generator setting data for recovering lost tone generator setting data can be obtained by referring to the tone generator setting buffer 21*b* shown in FIG. 2.

Figure 4:
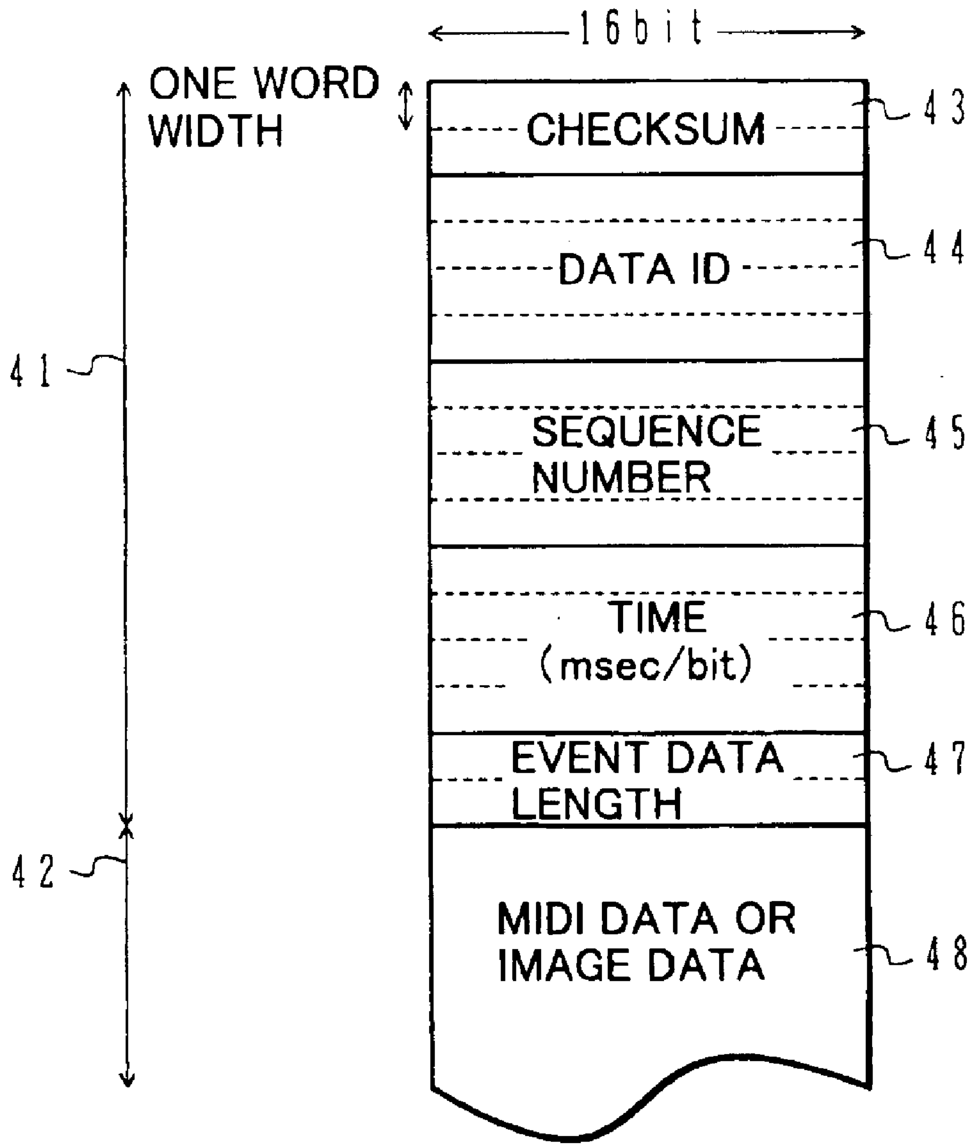
FIG. 4 shows the format of a communications packet.

FIG. 4 shows the format of a communications packet. A communications packet is transmitted from the encoder 3, 5 shown in FIG. 1 or received by the personal computer 9 shown in FIG. 1.

The packet is constituted of a header field 41 and a data field 42. The header field 41 contains checksums 43 of two words (one word is 16 bits), a data ID 44 of four words, a sequence number 45 of four words, time data 46 of four words, and an event data length 47 of two words.

The checksums 43 are representative values of all data in the header field 41 excepting the checksums and in the data field 42. The transmitting side calculates these representative values and transmits a packet added with the checksums 43. The receiving side recalculates the representative values of data in the packet and checks whether the recalculated representative values are coincide with the transmitted checksums 43. If coincident, it is judged that there is no communications error.

The data ID 44 is a number identifying the type of the data field 42. The numbers "0", "1" and "2" indicate MIDI data and the number "3" indicates image data. The number "0" indicates real event data (ordinary MIDI data), the number "1" indicates the recovery key data (FIG. 3), and the number "2" indicates the recovery tone generator setting data.

The sequence number 45 is a number assigned to each packet in the sequential order. By checking the sequence number 45, the receiving side can recover or reorder the packets even if the order of packets is changed by communications errors.

The time data 46 indicates a reproduction time representing 1 ms by one bit. Since this data 46 has four words, the time information of 100 hours or longer can be given. Using this time information 46 allows a simultaneous session of a plurality of concert halls. A simultaneous musical performance can be listened at home by assigning the time information 46 as a musical performance time at each concert hall and providing synchronization between a plurality of concert halls. Although the time information 46 is preferably an absolute time, it may be a relative time commonly used by all concert halls.

The event data length 47 indicates the length of data in the data field 42.

The data field 42 contains real data 48 which is MIDI data or image data. The MIDI data contains the recovery key data and recovery tone generator setting data.

A high communications speed is preferable, for example, 64 K bits/s (ISDN). The data length of one packet is not limited. It is preferably about 1 K bytes or 512 bytes from the viewpoint of communications efficiency.

Figure 5:
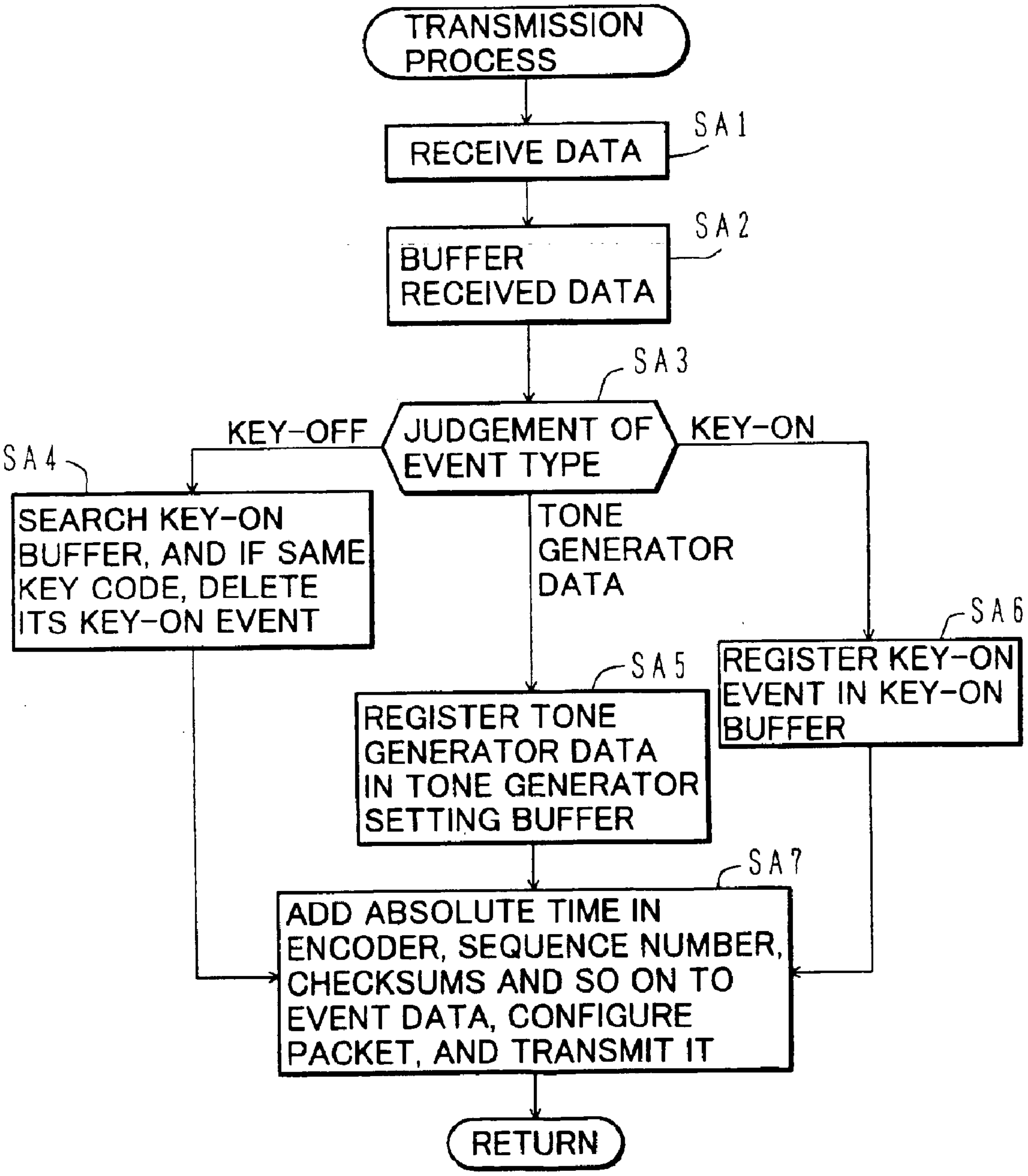
FIG. 5 is a flow chart illustrating the operation of a transmission process to be performed by an encoder.

FIG. 5 is a flow chart illustrating the operation of a transmission process to be executed by the encoder 3.

At Step SA1, MIDI data is received from the MIDI musical instrument 2. At Step SA2, the received data is buffered in RAM 21.

At Step SA3, the type of an event of the received data is checked. The type of an event includes a key-on event, a key-off event and a tone generator setting data event. If the type is key-on, the flow advances to Step SA6 whereat the key-on event is registered in the key-on buffer 21*a* (FIG. 2) to thereafter follow Step SA7.

If the type is key-off, the flow advances to Step SA4 whereat the key-on buffer 21*a* is searched. If there is the same key code (sound pitch), the corresponding key-on event is deleted from the key-on buffer 21*a* to thereafter follow Step SA7.

If the type is tone generator setting data, the flow advances to Step SA5 whereat the tone generator setting data is registered in the tone generator setting buffer 21*b* (FIG. 2) to thereafter follow Step SA7. The tone generator setting data includes program change data, control data, exclusive message data, and the like.

At Step SA7, the received MIDI data is added with, as shown in FIG. 4, checksums 43, a data ID (No. 0) 44 indicating real event data, a sequence number 45, a time data 46 of the timer 24 (FIG. 2) and an event length 47. In this case, a plurality of events of the same type generated at generally the same time may be collected and configured into one packet to be transmitted. After Step SA7, the transmission process is terminated.

By using the same process, the encoder 4 transmits image data. In this case, the data ID 44 is No. 3.

Figure 6A:
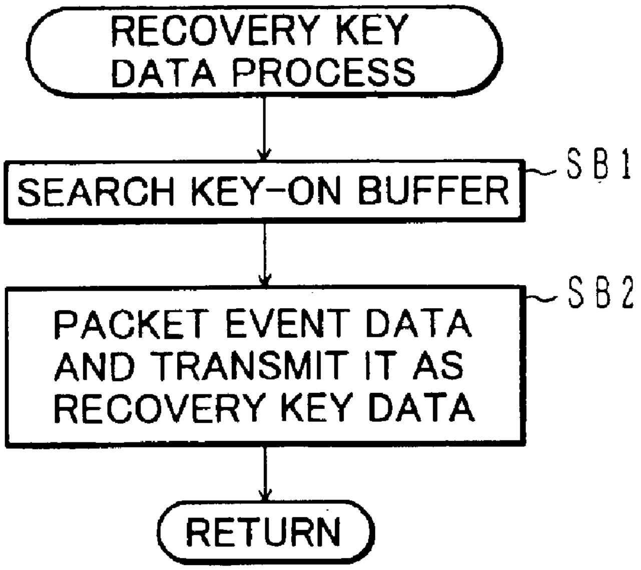
FIGS. 6A and 6B are flow charts illustrating the operation of an interrupt process to be performed by the encoder, the flow chart of FIG. 6A illustrating a transmission process of recovery key data and the flow chart of FIG. 6B illustrating a transmission process of recovery tone generator setting data.
Figure 6B:
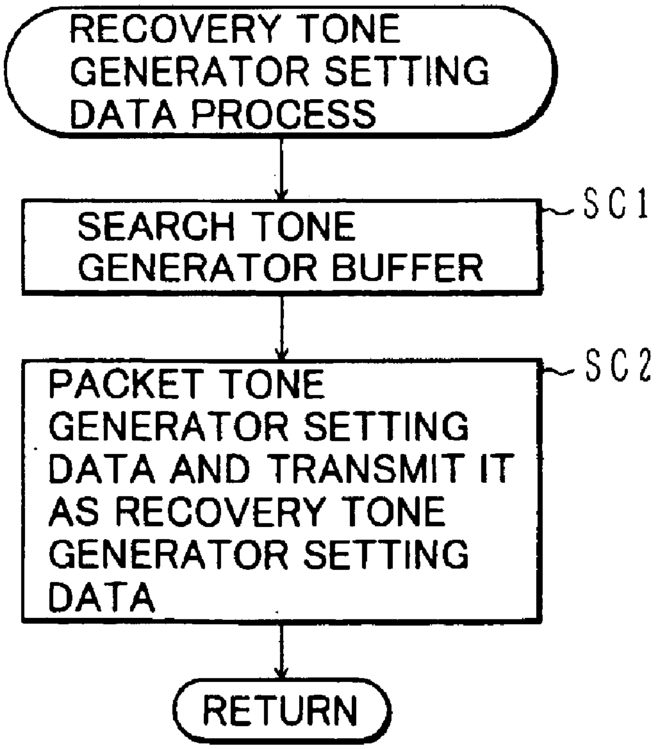

FIGS. 6A and 6B are flow charts illustrating the interrupt process to be executed by the encoder 3. This interrupt process is performed at a predetermined interval in response to the timing supplied from the timer 24. For example, the interrupt process is performed at an interval of 100 to 200 μs.

FIG. 6A is a flow chart illustrating the transmission process of recovery key data.

At Step SB1, the key-on buffer 21*a* (FIG. 2) is searched. At Step SB2, the key-on event data in the key-on buffer 21*a* is packeted as shown in FIG. 4 and transmitted as the recovery key data. In this case, a velocity (sound volume) lower than that contained in the key-on event data stored in the key-on buffer 21*a* is set to the recovery key data, the velocity being set lower by an amount corresponding to the time lapse from the start of the key-on event.

The data ID 44 in the packet is No. 1 indicating the recovery key data. The sequence number 45 of this packet is the same as that of the real event data (FIG. 5). After the recovery key data is transmitted, the process before this interrupt process is resumed.

FIG. 6B is a flow chart illustrating the transmission process for recovery tone generator data. A relatively low precision of time is required for this transmission process so that the process may be performed at an interval longer than that of the recovery key data transmission process (FIG. 6A).

At Step SC1, the tone generator setting buffer 21*b* (FIG. 2) is searched. At Steps SC2, the event data in the tone generator setting buffer 21*b* is packeted as shown in FIG. 4 and transmitted as the recovery tone generator setting information.

The data ID 44 in the packet is No. 2 indicating the recovery tone generator setting data. The sequence number 45 of this packet is the same as those of the real event data (FIG. 5) and recovery key data (FIG. 6A). After the recovery tone generator setting data is transmitted, the process before this interrupt process is resumed.

Figure 7:
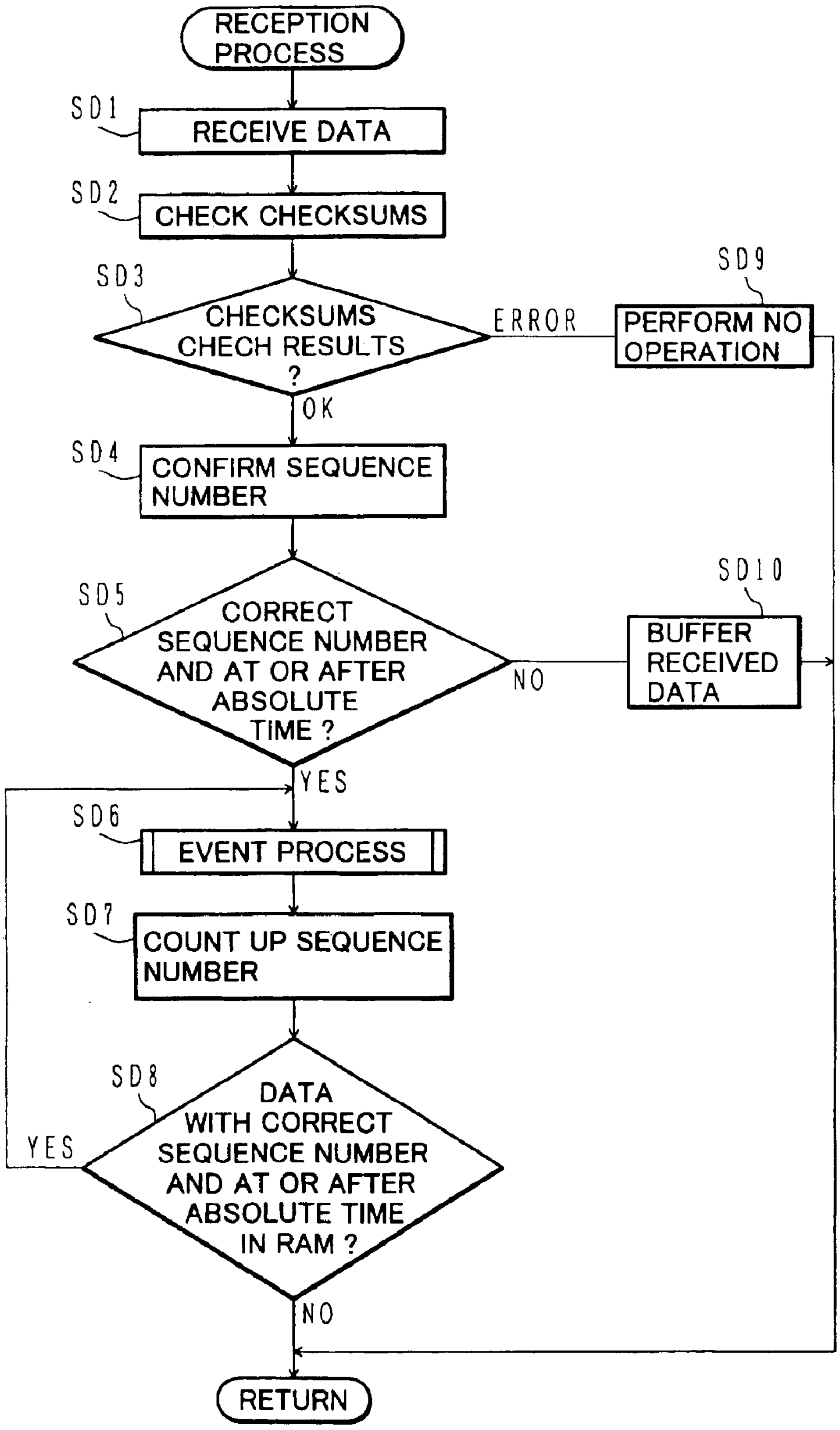
FIG. 7 is a flow chart illustrating the operation of a reception process to be performed by a home computer.

FIG. 7 is a flow chart illustrating the reception process to be executed by the home computer 9.

At Step SD1, data on the Internet is received. At Step SD2, the checksums 43 (FIG. 4) in the received packet are checked. If not coincident, there is a data error or errors.

At Step SD3 it is checked whether the check result of the checksums is normal or error. If error, it means that the data in the packet has an error or errors so that the flow advances to Step SD9 to terminate the process without performing any operation. Not performing any operation and discarding the data having less reliability is effective because false sound reproduction and setting are not performed.

If the checksums are normal, the data in the packet is reliable so that the flow advances to Step SD4 whereat the sequence number 45 (FIG. 4) in the packet is checked. In normal communications, the sequence number 45 increases each time a packet is received. However, the order of sequence numbers of received packets changes if there is a communications error or errors.

It is checked at Step SD5 whether the received data has the correct sequence number 45 and the current time at the home computer 9 is the same as or later than the reproduction time 46 (FIG. 4). In the simultaneous session of a plurality of concert halls, there may be a concert hall whose time data 46 is still not the reproduction time. If the current time becomes the same as the time data 46, one of the above check conditions is satisfied.

If the current time is before the reproduction time 46, the flow advances to Step SD10 whereat the received data is buffered in RAM for the preparation of a later process at the correct timing. After Step SD10, the reception process is terminated.

If it is necessary to reproduce the received data, the flow advances to Step SD6 whereat an event process is performed. The event process is performed for MIDI data and image data, the details thereof being later described with reference to the flow chart of FIG. 8.

At Step SD7, the sequence number is counted up. At Step SD8, it is checked whether there is data buffered in the buffer at Step SD10, the data having the correct sequence number 45, and whether the current time at the home computer 9 being the same as or later than the reproduction time 46.

If there is no data to be reproduced, the reception process is terminated, whereas if there is data to be reproduced, the flow returns to Step SD6 to perform the above processes at Steps SD6 and SD7. The received data whose order was changed by a communications error can be properly processed in the above manner. If the buffer has no data to be reproduced, the reception process is terminated.

If data of a predetermined amount or more is stored in the buffer, it is judged that the data having the sequence number to be next processed was lost, the process for this data is skipped, and the process for the data having the next sequence number is performed.

Figure 8:
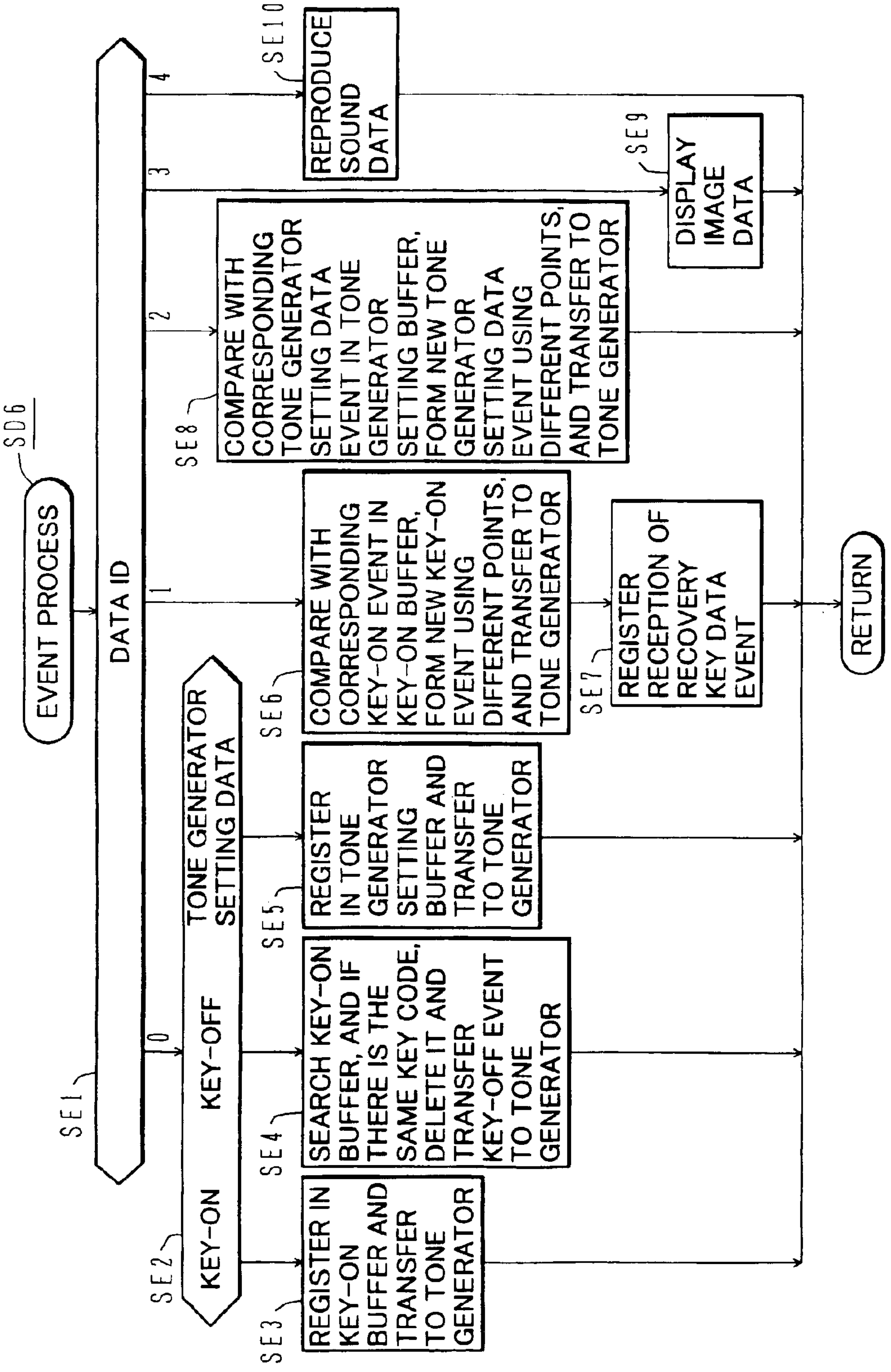
FIG. 8 is a flow chart illustrating the details of an event process at Step SD6 of FIG. 7.

FIG. 8 is a flow chart illustrating the detailed operation of the event process at Sep SD6 of FIG. 7.

At Step SE1, the number of the data ID 44 (FIG. 4) is checked. If the number is “0”, it means real event data and the flow advances to Step SE2 whereat the type of the event is checked. The type of an event includes a key-on event, a key-off event and a tone generator setting data event.

If the type of the event is key-on, the flow advances to Step SE3 whereas the key-on event is registered in the key-on buffer 21*a* (FIG. 2) and transferred to the tone generator. Upon reception of the key-on event, the tone generator performs a process of starting sound reproduction. Thereafter, the process returns to Step SD7 shown in FIG. 7.

If the type of the event is key-off, the flow advances to Step SE4 whereat the key-on buffer 21 is searched. If there is the same key code (sound pitch), the key-On event in the key-on buffer 21*a* is deleted, and the key-off event is transferred to the tone generator. Upon reception of the key-off event, the tone generator performs a process of stopping sound reproduction. Thereafter, the process returns to Step SD7 shown in FIG. 7.

If the type of the event is tone generator setting data, the flow advances to Step SE5 whereat the tone generator setting data is registered in the tone generator setting buffer 21*b* (FIG. 2) and transferred to the tone generator. Upon reception of the tone generator setting data, the tone generator sets a tone color, a sound volume and the like. Thereafter, the process returns to Step SD7 shown in FIG. 7.

If the number of the data ID is “1”, it means the received data is recovery key data, and the flow advances to Step SE6 whereat the recovery key data is compared with the corresponding key-on event in the key-on buffer 21*a* and different points between them are used as a new key-on event which is registered in the key-on buffer 21*a* and transferred to the tone generator. In this manner, a key-on event lost by a communications error can be recovered.

At Step SE7, a reception of the recovery key data is registered. This registration allows to confirm the key-on state until the recovery key data is not periodically transmitted after the key-off. If the recovery key data is not periodically transmitted even if a key-on event is present in the key-on buffer, it means that the key-off event was lost. Thereafter, the process returns to Step SD7 shown in FIG. 7.

If the number of the data ID is “2”, it means that the received data is tone generator setting data, and the flow advances to Step SE8 whereat the recovery tone generator setting data is compared with the corresponding tone generator setting data in the tone generator setting buffer 21*b* and different points between them are used as a new tone generator setting data event which is registered in the tone generator setting buffer 21*b* and transferred to the tone generator. In this manner, a tone generator setting data lost by a communications error can be recovered. Thereafter, the process returns to Step SD7 shown in FIG. 7.

If the number of the data ID is “3”, it means that the received data is image data, and the flow advances to Step SE9 whereat a process of displaying the image data on the display device is performed. The image data is processed with a lower priority than the MIDI data. Basically, a display image is processed in the unit of one frame. In order to give the MIDI data a priority over the image data, the display image may be a still image. Thereafter, the process returns to Step SD7 shown in FIG. 7. If the number of the data ID is "4", it means that the received data is sound data, and the flow advances to Step SE10 whereat a process of reproducing the sound data is performed.

Figure 9:
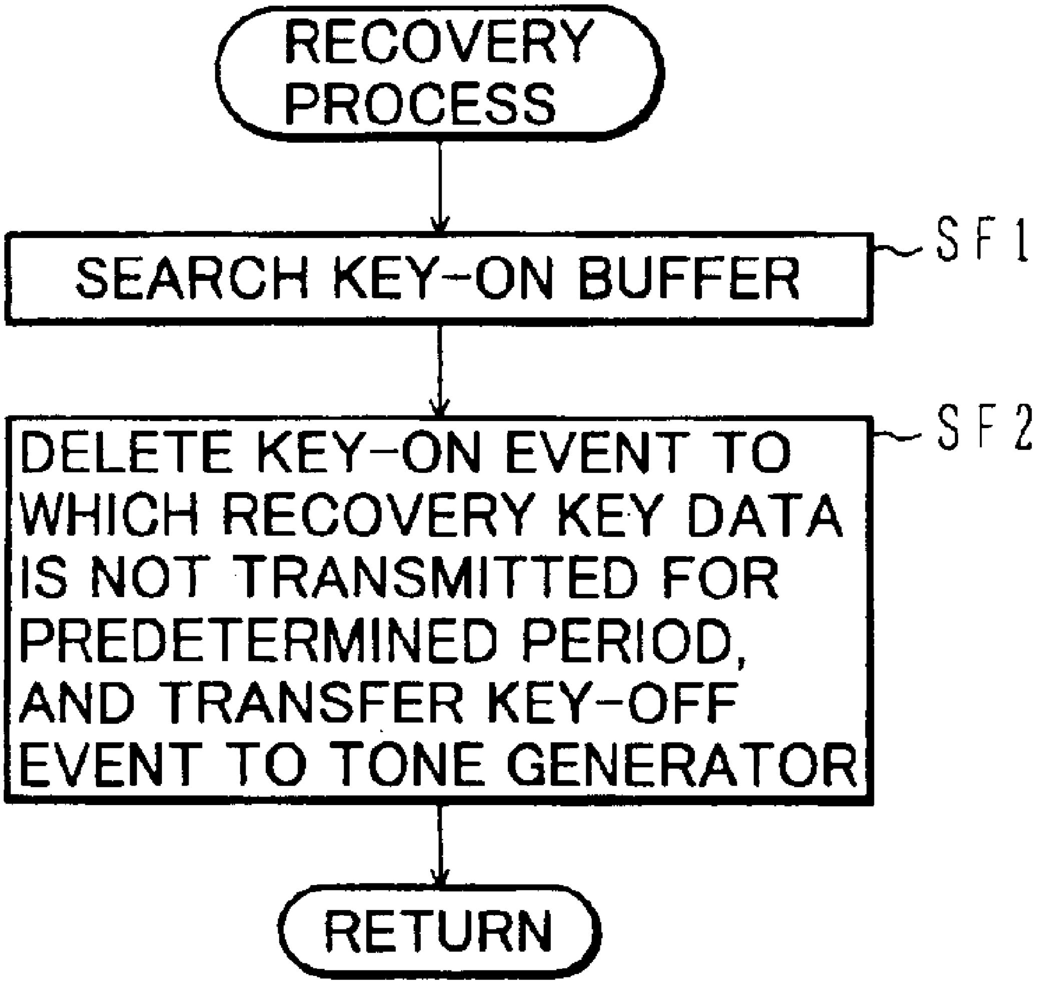
FIG. 9 is a flow chart illustrating the operation of an interrupt process to be performed by a home computer.

FIG. 9 is a flow chart illustrating the operation of an interrupt process to be executed by the home computer 9. This interrupt process is performed at a predetermined interval in response to the timing supplied from the timer 24. For example, the interrupt process is performed at an interval of 100 to 200 μs.

At Step SF1, the key-on buffer 21*a* (FIG. 2) is searched. At Step SF2, of key-on events stored in the key-on buffer 21*a* (FIG. 2), the key-on event to which recovery key data is not transmitted for a predetermined period is deleted, and a key-off event is transferred to the tone generator. After the key-off event is transferred, the process returns to the process which was executed before this interrupt process. The predetermined period may be a time duration sufficient for receiving the recovery key data at least twice.

With the above recovery process, a false continuation of sound reproduction can be avoided even if a key-off event is lost by a communications error. The judgement that recovery key data is not received for the predetermined period becomes possible because the reception of recovery data is registered at Step SE7 in FIG. 8.

Since the recovery key data and recovery tone generator setting data (hereinafter, both the data are collectively called recovery data) are transmitted, a proper recovery is ensured even if there is data change or data loss.

Next, a method of alleviating the traffic congestion of communications lines will be described. For the communications of musical performance data and recovery data, a fairly large amount of data flows on a communications line of the network. The number of users accessing the server at the same time for attending the music concert is also very large.

Under such circumstances, smooth reproduction of a musical performance by the home computer 9 of each user may become unable in some cases. In order to alleviate the congestion of communications lines, each of a plurality of proxity servers 12 shown in FIG. 1 reduces the data amount in accordance with the congestion degree of communications lines.

If the data amount is reduced, the sound quality or image quality is lowered. In this connection, each proxity server 12 has a data reduction factor, data reduction method, and the number of accessible users, specific to the proxity server 12.

If the number of users accessing the proxity server 12 is small, the proxity server does not reduce the data amount, whereas if the number of accessing users becomes large, the proxity server reduces the data amount and transmits the reduced data.

The following methods may be used for reducing the data amount.

(1) Data Separation

The proxity server receives the musical tone data (MIDI data), image data and sound information (audio data). The image data requires an image quality not so high as the MIDI data. Therefore, the proxity server may transmit only the MIDI data and sound information by separating the received data into MIDI data, sound information and image data. Similarly, each of the MIDI data, sound information and image data may be separated further to transmit only necessary data. The congested traffic of communications lines can be alleviated by transmitting only important data.

(2) Data Discrimination

The proxity server may determine the priority order of data and preferentially transmit important data. Specifically, while communications lines are congested, only important data is transmitted during this period, and during a later period the data not important is transmitted. Although this method does not reduce the total data amount, the data amount transmitted during each period can be reduced.

For example, loss of a key-off event is a fatal error as compared to a loss of a key-on event. Therefore, the key-off event has a higher importance degree of data. The proxity server may separate the received packet into a key-off event and other data to first transmit the key-off event and then transmit the other data.

If a packet contains both a key-on event and a key-off event and the key-off event separated from the packet is first transmitted and then the key-on packet is transmitted, this transmission order is not proper. In this case, therefore, both the events are preferably not transmitted. Similarly, if there is any discrepancy in preferential transmission, a necessary countermeasure is required.

(3) Data Resolution Setting

In order to reduce the data amount, the proxity server may transmit data at a low resolution to a user. For example, if the sound volume increases by one step as the time lapses, the data at a low resolution increasing the sound volume by two steps is transmitted to halve the data amount. The resolution may be lowered not only for the sound volume but also for other control data (data supplied from controllers) such as a pitch event and an after-touch event. Different resolutions may be set in accordance with the type of controller to lower the total resolution of a plurality of control data sets.

(4) Time Resolution Setting

The recovery data is periodically transmitted. Therefore, the proxity server may prolong the period of transmitting recovery data in order to reduce the data amount. The transmission rate of image data may be lowered. For example, eight frames per second may be lowered to four frames per second to reduce the data amount.

Next, the proxity server will be described. The structure of the proxity server is similar to that of the computer shown in FIG. 2. The tone generator 28 and MIDI interface 30 are not necessarily required.

Figure 10:
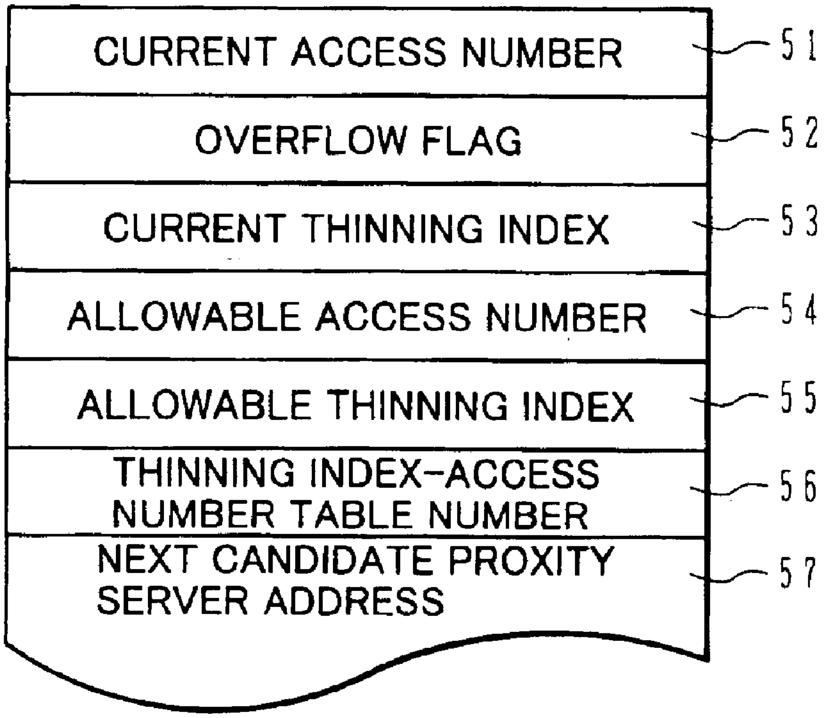
FIG. 10 is a diagram showing the structure of a memory of a proxity server.

FIG. 10 shows the structure of a RAM of the proxity server 12 shown in FIG. 1.

RAM of each of a plurality of proxity servers 12*a*, 12*b*, 12*c*, . . . stores the following data.

(1) The Number of Current Accesses: 51

The number 51 of current accesses is the number of users (communication lines) now accessing the proxity server and changes with time. The access number is initially set to "0", increases as the number of accessing users increases, and decreases as the number of accessing users decreases.

(2) Overflow Flag: 52

The overflow flag 51 indicates whether the proxity server is in an overflow state. The overflow flag 52 is initially set to "0" which means no overflow. When the number of users accessing the proxity server reaches an allowable access number 54 to be later described, the overflow flag 52 is set to "1".

(3) Current Thinning Index: 53

The current thinning index 53 is a currently set thinning index. This index indicates a data reduction (also called data thinning hereinafter) factor and a thinning method. The thinning index 53 is initially set to "0" which means no data thinning. Table 1 shows examples of the thinning indices.

TABLE 1

| Thinning index | Thinning method |
|---|---|
| 0 | All data is transmitted (no thinning) |
| 1 | Every third recovery tone generator setting data is transmitted |
| 2 | Every fourth recovery tone generator setting data is transmitted |
| . | |
| . | |
| . | |
| m | Every third recovery key data is transmitted |
| . | |
| . | |
| . | |
| n | Resolution of control data is set to ½ |
| n + 1 | Resolution of control data is set to ¼ |
| . | |
| . | |
| . | |
| z | Image data is not transmitted |

A combination of any ones of the thinning indices may be used as one thinning index.

(4) Allowable Access Number: 54

The allowable access number 54 is the maximum number of users (communication lines) accessible to the proxity server and may take any desired value. The allowable access number corresponds to the maximum access capacity of the proxity server.

(5) Allowable Thinning Index: 55

The allowable thinning index 55 is the maximum allowable value of a thinning index allowed by the proxity server. Preferably, the allowable thinning index is the allowable maximum value of total thinning by each weighted thinning method. For example, the thinning index corresponds to a thinning ratio, and the larger the index, the larger the thinning ratio. Each proxity server can determine its specific allowable thinning index in accordance with the access number.

(6) Table Number: 56

Figure 11:
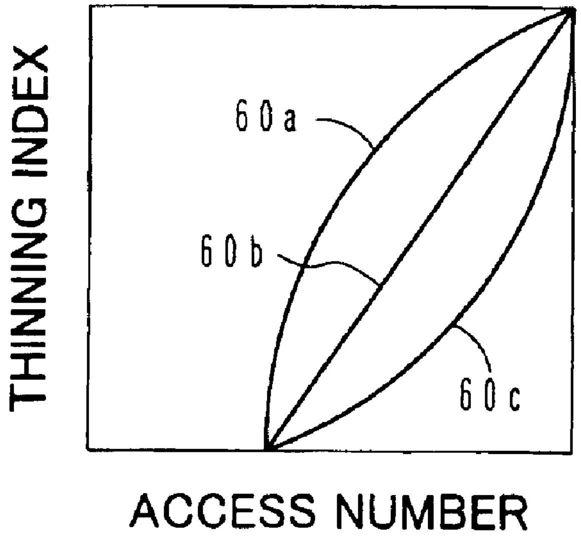
FIG. 11 is a graph showing the relationship between the number of accesses and a thinning index.

The table number 56 is the number of a table which shows a correspondence between the access number and the thinning index. FIG. 11 shows examples of characteristic curves 60*a*, 60*b* and 60*c* of three tables. Each table shows a correspondence between the access number and the thinning index. It is preferable that the larger the access number, the larger the access index and the larger the data reduction amount. The characteristic curves 60*a* to 60*c* are not necessary to take a continuous value, but may take a discrete value. The value of the thinning index does not always indicate the data reduction amount, so that it is not necessarily required to take a larger value as the access number increases. These tables are stored in a memory (e.g., RAM).

A plurality of tables (e.g., three tables 60*a* to 60*c*) are prepared, and the number of the table most suitable for the proxity server is used as the table number 56.

(7) Next Candidate Proxity Server Address: 57

The next candidate proxity server address 57 is an address of the next candidate proxity server of the proxity server in concern when the latter overflows. When a user accesses a proxity server and this server is overflowing, this access is automatically switched to the proxity server indicated by the next candidate proxity server address.

Figure 12:
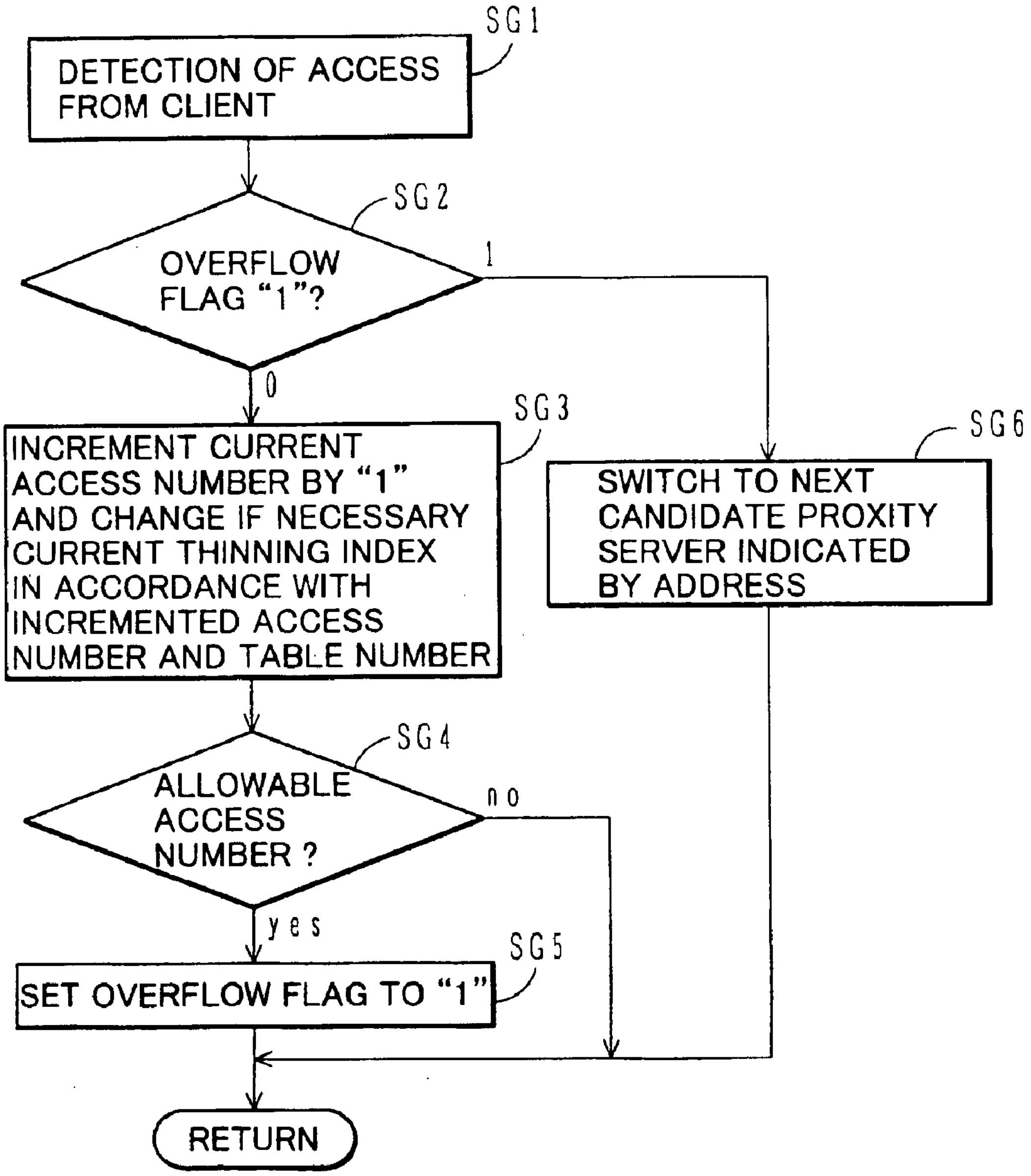
FIG. 12 is a flow chart illustrating the operation of a process to be performed by a proxity server when a user accesses the proxity server.

FIG. 12 is a flow chart illustrating the operation of the proxity server when a user accesses it.

At Step SG1, when an access from a user (client) is detected, the processes at Step SG2 and following Steps are performed. By accessing the proxity server, a user can obtain MIDI data, sound information and image data.

At Step SG2, it is checked whether the overflow flag 52 (FIG. 10) is "0" or "1". If the overflow flag is "1", it means that the access number is larger than the allowable access number, and the flow advances to Step SG6.

At Step SG6, the access is switched to the next candidate proxity server indicated by the next candidate proxity server address 57 (FIG. 10). Namely, the user access is automatically switched to the next proxity server. As a result, the user accesses this next proxity server. If the next candidate proxity server is also overflowing, the second next proxity server is accessed. In this manner, if the accessed proxity server is congested, the access is automatically switched to the proxity server not congested. After the access is switched to another proxity server, the first accessed proxity server terminates its operation.

If it is judged at Step SG2 that the overflow flag is "0", it means that the access number of this proxity server is smaller than the allowable access number, and the flow advances to Step SG3.

At Step SG3, the current access number 51 (FIG. 10) is incremented by 1. The access number 51 is the number of users currently accessing the proxity server. Each time an access from a user is permitted, the proxity server increments the access number 51 by 1.

Next, with reference to the table (FIG. 11) indicated by the table number 56 (FIG. 10), the thinning index corresponding to the current access number 51 is obtained and written in the memory as the current thinning index 53. If the obtained thinning index is the same as the previously used one, the write operation may be omitted. As the access number becomes large, the thinning index having a large thinning ratio is selected.

At Step SG4, it is checked whether the current access number 51 is same as the allowable access number 54 (FIG. 10). If same, the flow advances to Step SG5 whereat the overflow flag 52 is set to "1" so as not to increase the access number more than the allowable access number. If not same, the overflow flag is maintained "0". Thereafter, the above operation by the proxity server is terminated.

Figure 13:
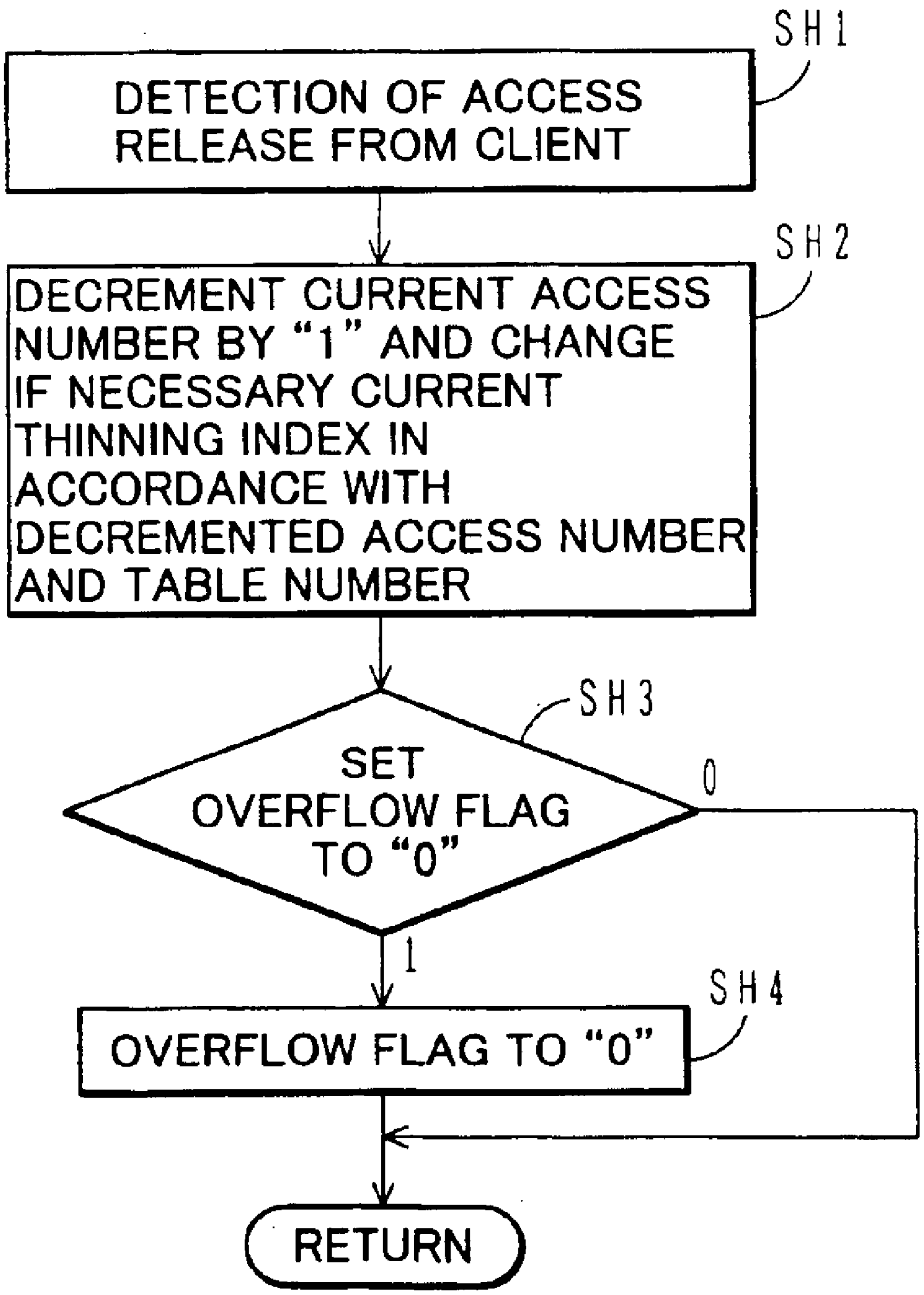
FIG. 13 is a flow chart illustrating the operation of a process to be performed by a proxity server when a user releases an access to the proxity server.

FIG. 13 is a flow chart illustrating the operation of the proxity server when a user releases its access.

At Step SH1, when an access release by a user (client) is detected, the processes at Step SH2 and following Steps are performed.

At Step SH2, the current access number 51 (FIG. 10) is decremented by 1. Each time an access release by a user is detected, the proxity server decrements the access number 51 by 1.

Next, with reference to the table (FIG. 11) indicated by the table number 56 (FIG. 10), the thinning index corresponding to the current access number 51 is obtained and written in the memory as the current thinning index 53. If the obtained thinning index is the same as the previously used one, the write operation may be omitted. As the access number becomes small, the thinning index having a small thinning ratio is selected.

At Step SH3, it is checked whether the overflow flag 52 (FIG. 10) is "1". If the overflow flag is "1", the flow advances to Step SH4 to set the overflow flag to "0" so as to permit a new access. If the overflow flag is "0", it is maintained "0". Thereafter, the above operation by the proxity server is terminated.

The overflow flag may not be checked at Step SH3, and the overflow flag is set to "1" irrespective of the overflow value of "1" or "0". Also in this case, the operation equivalent to the above can be realized.

Figure 14:
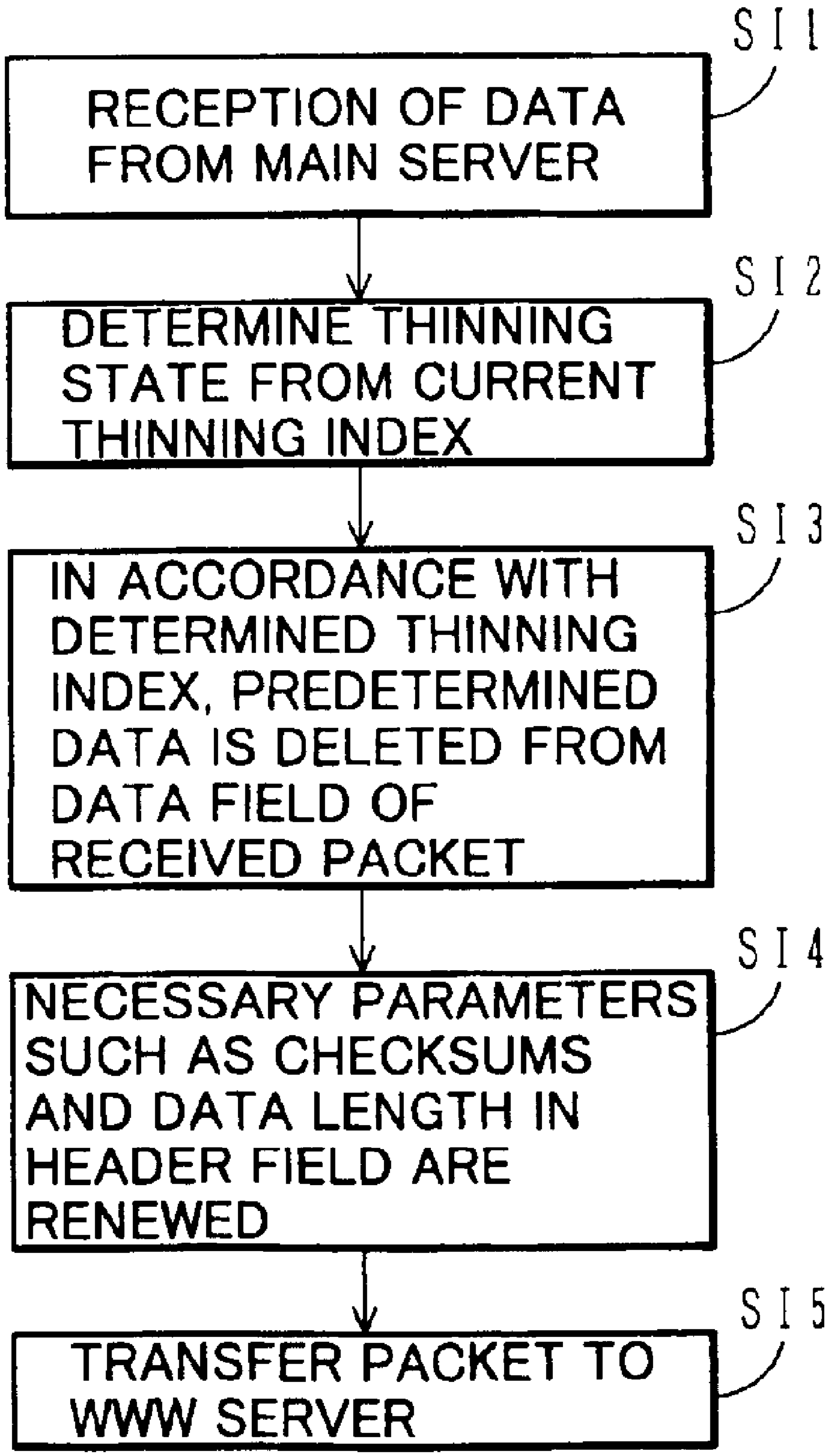
FIG. 14 is a flow chart illustrating the operation of a process to be performed by a proxity server when it receives data from a main server.

FIG. 14 is a flow chart illustrating the operation of the proxity server when it receives data from the main server.

At Step SI1, the proxity server receives data in the packet form from the main server 7 (FIG. 1). The data includes musical tone data (inclusive of recovery data), sound information and image data. The proxity server receives data not thinned. A plurality of proxity servers all receive the same data.

At Step SI2, in accordance with the current thinning index 53 (FIG. 10), a thinning method (state) is determined. For example, if the thinning index is "0", the data is not thinned.

At Step SI3, in accordance with the determined thinning method, the predetermined data is deleted from the data field 42 (FIG. 4) of the received packet.

At Step SI4, the checksums 43, data length 47 and the like in the packet header field 41 (FIG. 4) are renewed to match the data whose predetermined data was deleted.

At Step SI5, the renewed packet is transmitted to the WWW server 8 (FIG. 1). The WWW server 8 receives the predetermined thinned data. All the proxity servers receiving the same data from the main server 7 may perform different thinning operations to transfer data to the WWW server. The above processes by the proxity server are thereafter terminated.

Figure 15:
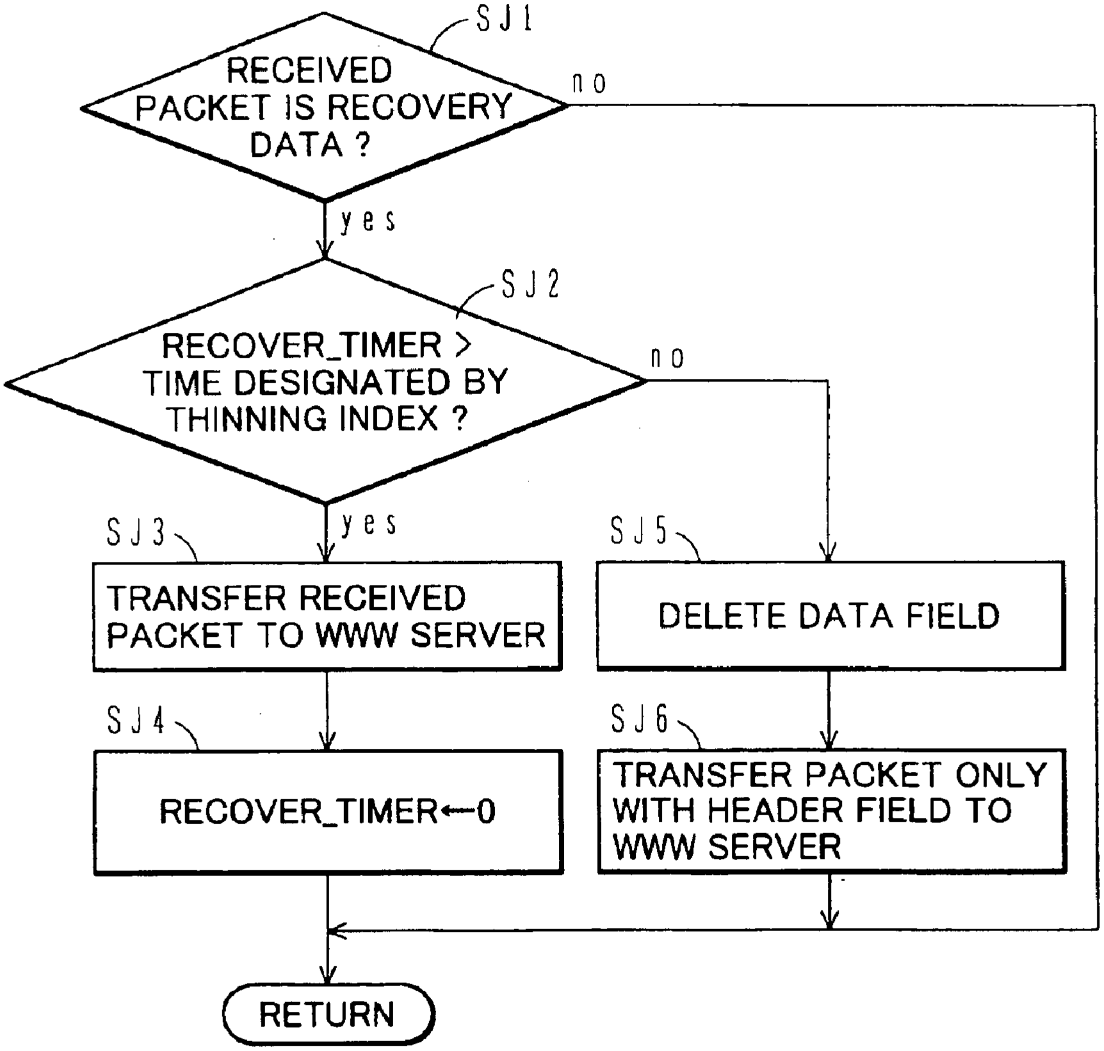
FIG. 15 is a flow chart illustrating the operation of a process to be performed by a proxity server when it thins recovery data.

FIG. 15 is a flow chart illustrating the operation of the proxity server when it thins the recovery data. When recovery data is received, a recover_time register is reset to "0", and thereafter it is incremented by 1 each time a predetermined time lapses. The recover_timer register shows a lapse time after the previous recovery data is received.

At Step SJ1, it is checked whether the packet received from the main server 7 is recovery data. This check is performed by referring to the data ID 44 (FIG. 4). If the value of the data ID is "1" or "2", the received packet is recovery data. This flow chart illustrates the operation of thinning recovery data, and if data other than the recovery data is received, this process is terminated immediately. When the recovery data is received, the flow advances to Step SJ2.

At Step SJ2, it is checked whether the value of the recover_timer register is larger than the time designated by the thinning index. The recover_timer register shows a lapse time after the previous recovery data is received. The time designated by the thinning index corresponds to the period of transmitting the recovery data.

If the value of the recover_timer register is larger than the time designated by the thinning index, the flow advances to Step SJ3.

At Step SJ3, the received packet is transferred to the WWW server 8. At Step SJ4, the recover_timer register is set to "0" to terminate the above processes. The recover_timer register is counted up at a predetermined time interval by an interrupt process. This interrupt process is enabled at the predetermined time interval by the timer 24 shown in FIG. 2.

If it is judged at Step SJ2 that the value of the recover_timer is not larger than the time designated by the thinning index, it means that the predetermined time does not still lapse, and the flow advances to Step SJ5.

At Step SJ5, all the data field of the received packet is discarded and only the header field is left. At Step SJ6, the packet constituted of only the header field is transferred to the WWW server 8 to thereafter terminate the above processes.

In the above operation, the packet with only the header field is transferred. Instead, the packet itself may not be transferred in order to further reduce the data amount. In this case, however, it is necessary to judge whether the packet is deleted by thinning or it is lost by a communications error. If the packet is lost by a communications error, it is necessary to recover it, whereas if it is deleted by thinning, it is unnecessary to recover it.

Instead of counting up the value of the recover_timer register by the interrupt process, the number of receptions of recovery data from the main server may be counted. For example, of three receptions of recovery data from the main server, the recovery data received at the first and second times is deleted and the packets with only the header field are transferred, and for the recovery data received at the third time, the packet with both the header and data fields is transferred. With this process, it is not necessary to count up the value of the recover_timer register by the interrupt process.

In order to simplify the process, the sequence number 45 and time data 46 in the packet may not be renewed. Conversely, if the data quality is to be improved, the sequence number 45 and time data 46 may be renewed. This additional data renewal can recover more reliably the data lost by communication errors such as data loss and data change.

Figure 16:
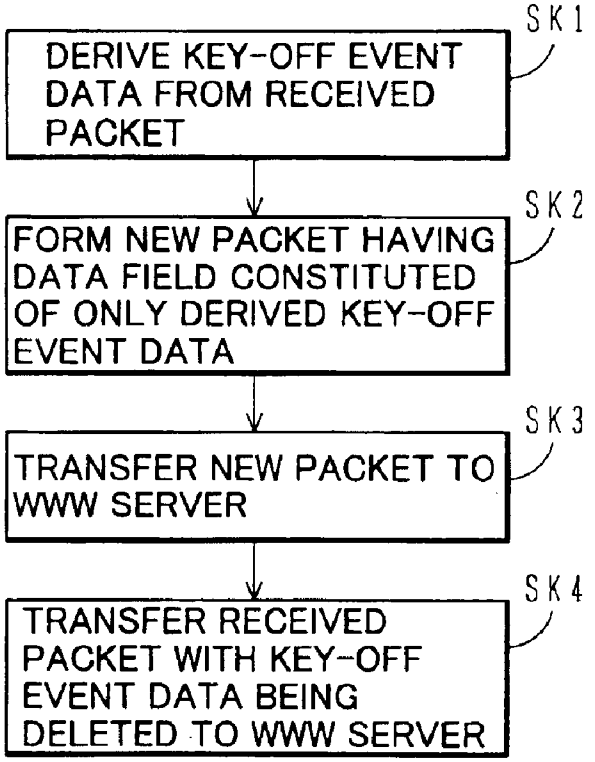
FIG. 16 is a flow chart illustrating the operation of a process to be performed by a proxity server when it preferentially transmits key-off event data.

FIG. 16 is a flow chart illustrating the operation of the proxity server when it transmits a key-off event with a priority over the key-on event.

At Step SK1, the key-off event data is derived from the packet received from the main server, and the flow advances to Step SK2. If the packet does not contain key-off event data, the whole received packet is transferred to the WWW server 8.

At Step SK2, a new packet having the data field containing only the derived key-off event data is generated.

At Step SK3, the newly generated packet is transferred to the WWW server 8.

At Step SK4, the remaining packet with the key-off event data being deleted is transferred to the WWW server 8 to thereafter terminate the above processes. In the above processes, the data in the packet is separated into the key-off event data and other data, first at Step SK3 the key-off event data is preferentially transferred, and then at Step SK4 the other data is transferred.

As the transfer timing at Step SK4 is delayed from the transfer timing at Step SK3, data can be transferred in a dispersed manner, the traffic congestion can be alleviated as compared to the case where all the data is transferred at the same time.

Figure 17:
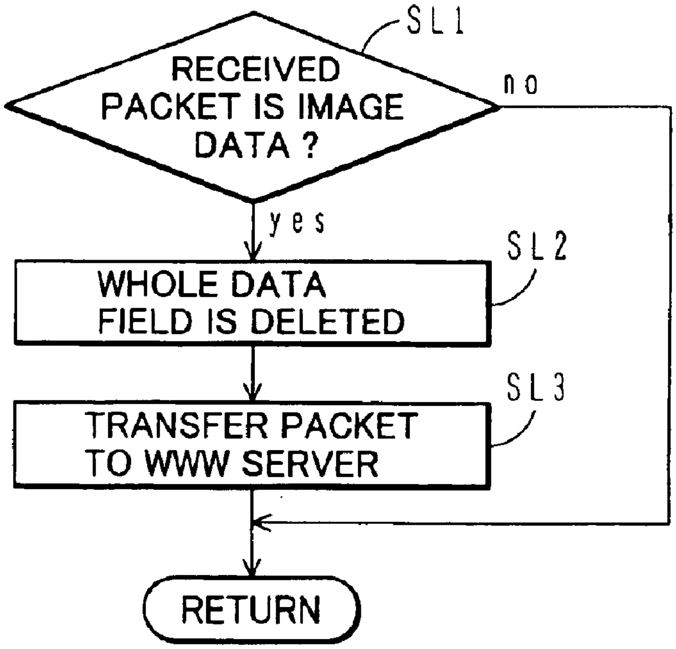
FIG. 17 is a flow chart illustrating the operation of a process to be performed by a proxity server when it transfers data by deleting image data.

FIG. 17 is a flow chart illustrating the operation of the proxity server when it transfers data by deleting the image data.

At Step SL1, it is checked whether the packet received from the main server is image data. This check is realized by referring to the data ID 44 (FIG. 4). If the value of the data ID is "3", the received packet is image data. This flow chart illustrates the operation of deleting image data, and if data other than the image data is received, this process is terminated immediately. When the image data is received, the flow advances to Step SL2.

At Step SL2, the data field of the received packet is deleted and only the header field is left. At Step SL3, a packet with only the header field is transferred to the WWW server 8 to thereafter terminate the above processes.

Also in this case, instead of transferring the packet with only the header field, the packet itself may not be transferred in order to further reduce the data amount.

Figure 18:
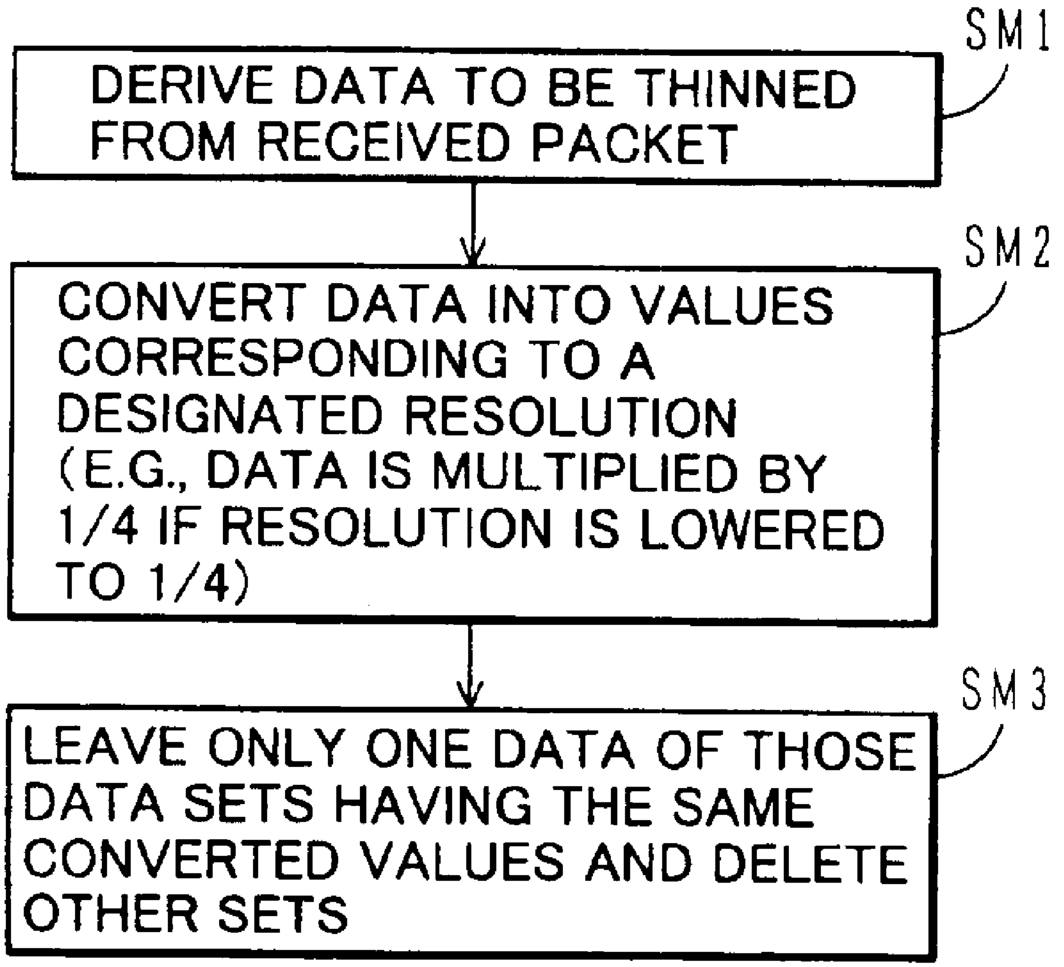
FIG. 18 is a flow chart illustrating the operation of a process to be performed by a proxity server when it transfers data by lowering a resolution of the data.

FIG. 18 is a flow chart illustrating the operation of the proxity server when it transfers data by lowering the resolution.

At Step SM1, data to be thinned is derived from the packet received from the main server, and the flow advances to Step SM2. The data to be thinned includes control data such as volume data, pitch event data and after-touch event data. If the packet does not contain data to be thinned, the whole received packet is transferred to the WWW server 8.

At Step SM2, the data is converted into values corresponding to a designated resolution. For example, if a resolution is ¼, the data sets of the same type in the packet are all multiplied by ¼ and the decimal fractions are cut off.

At Step SM3, of the data sets having the same converted value, only one data set is left in the packet and all other data sets are deleted. The resultant packet is transferred to the WWW server.

The data to be thinned may be subjected to modulo calculation, and only the data sets with the calculation result of "0" may be left to delete all other data sets.

A plurality type of data sets to be thinned may be provided with each type being assigned a different resolution.

In the embodiment described above, musical performance information (MIDI data), sound data (audio data) and musical performance image (image data) in a concert hall can be supplied to a number of users by using the Internet. A user can obtain MIDI data and image data in real time at home without going to the remote concert hall.

If the encoder at each of a plurality of concert halls adds time data to MIDI data and the like, a simultaneous session by a plurality of concert halls becomes possible.

Each of a plurality of proxity servers reduces the data amount in accordance with the number of accesses to the proxity server, so that the traffic congestion can be alleviated. If the number of proxity servers is increased, the traffic congestion can be alleviated without thinning the data. If the data is thinned, the traffic congestion can be alleviated even if the number of proxity servers is small.

If the data amount is reduced, the sound quality and image quality are degraded. In this connection, each proxity server can select a data thinning ratio and method most suitable for the proxity server, and can set the desired number of accessible users.

The proxity server transmits information on the data thinning ratio and method to a user so that this information can be displayed on the screen of the display device of a home computer. For example, "Now, with lowered sound quality", "Now, with only musical tone data" or the like can be displayed. This display is preferably made when a user accesses the proxity server. A user can access a desired proxity server by referring to this display.

A mirror server is also used in the Internet. However, this mirror server is different from the proxity server of the embodiment in that all mirror servers perform the same operation and supply the same data.

The embodiment is not limited only to the Internet, but other communication systems may also be used, for example, digital serial communications of IEEE1394 specifications, communication satellites and the like.

The present invention has been described in connection with the preferred embodiments. The invention is not limited only to the above embodiments. It is apparent that various modifications, improvements, combinations, and the like can be made by those skilled in the art.

What is claimed is:

1. A musical tone data communication apparatus, comprising:

a receiver which receives a series of event data generated in sequence, each event data controlling production of musical tone and additional data to be synchronized with the event data;

a formatter which formats one or a plurality of the received event data into performance data blocks and the additional data into additional data blocks, each block of the performance data blocks and the additional data blocks including associated data which represents time; and a transmitter which transmits both the performance data blocks and the additional data blocks to a communication network.

2. The musical tone data communication apparatus according to claim 1, wherein said associated data corresponds to time of production of musical tone.

3. The musical tone data communication apparatus according to claim 2, wherein said time of production is in absolute time.

4. The musical tone data communication apparatus according to claim 1, wherein said event data is MIDI data.

5. The musical tone data communication apparatus according to claim 4, wherein said MIDI data is on real time base.

6. The musical tone data communication apparatus according to claim 4, wherein said MIDI data is generated by a live performance on real time base.

7. The musical tone data communication apparatus according to claim 1, wherein said additional data is wave data representing tone.

8. The musical tone data communication apparatus according to claim 7, further comprising a pick up device which picks up sound on real time base, converts the sound to the wave data and tansmits the wave data to said receiver.

9. The musical tone data communication apparatus according to claim 1, wherein said additional data is at least one of motion picture, sound and voice data.

10. The musical tone data communication apparatus according to claim 9, further comprising a pick up device which picks up at least one of motion picture.

11. The musical tone data communication apparatus according to claim 1, wherein said additional data is at least one of motion picture soudn, and voice, and said musical tone is produced to be synchronized with the production of at least one of motion picture, sound and voice.

12. The musical tone data communication apparatus according to claim 11, further comprising a pick up device which picks up at least one of motion picture, sound and voice on real time base, converts said at least one of motion picture, sound and voice to the additional data and transmits the additional data to said receiver.

13. The musical tone data communication apparatus comprising:

a receiver which receives performance data block and additional data block on a communication network, the performance data block including one or plurality of event data generated in sequence and controlling production of musical tone and first associated data associated data which represents time, and the additional data block including additional data to be synchronized with the event data and second associated data which represents time; and a returner which returns the performance data block into one or a plurality of event data and the first associated data, generates musical tone in accordance with the event data at timing corresponding to said time represented by the first associated data, returns the additional data block into the additional data and the second associated data, and reproduce the additional data to be synchronized with the event data at timing corresponding to said time represented by the second associated data.

14. The musical tone data communication apparatus according to claim 13, wherein said time of production is in absolute time.

15. The musical tone data communication apparatus according to claim 13, wherein said event data is MIDI data.

16. The musical tone data communication apparatus according to claim 15, wherein said MIDI data is on real time base.

17. The musical tone data communication apparatus according to claim 15, wherein said MIDI data is generated by a live performance on real time base.

18. The musical tone data communication apparatus according to claim 13, wherein said additional data is wave representing tone.

19. The musical tone data communication apparatus according to claim 13, wherein said additional data is at least one of motion picture, sound and, so as to produce said at least one motion picture, sound and voice based on the attached associated data.

20. The musical tone data communication apparatus according to claim 13, wherein said additional data is at leat one of motion picture, sound and voice to be synchronized with the event data, so as to produce a musical tone based on the event data and said at least one of motion picture, sound and voice based on the additiona data in synchronism with said musical tone.

21. A musical tone data communication system, comprising:

receiving means for receving a series of event data generated in sequence, each event data controlling production of musical tone and additional data to be synchronized with the event data;

formatting means for formatting one or a plurality of the received event data into performance data blocks and the additional data into additional data blocks, each block of the performance data blocks and the additional data blocks including associated data which represents time; and transmitting means for transmitting both the performance data blocks and the additional data blocks to a communication network.

22. The musical tone data communication apparatus according to claim 21, wherein said additional data is wave data representing tone.

23. The musical tone data communication apparatus according to to claim 21, wherein said additional data is at least one of motion picture, sound and voice data.

24. The musical tone data communication apparatus according to to claim 21, wherein said additional data is at least one of motion picture, sound and voice, and said musical tone is provided to be synchronized with the production of at least one of motion picture sound and voice.

25. A musical tone data communication system, comprising:

receiving means for receiving performance data block and additional data block on a communication network, the performance data block including one or a plurality of event data generated in sequence and controlling production of musical tone and first associated data which represents time, and the additional data block including additional data to be synchronized with the event data and second associated data which represents time; and returning means for performance data block into one a plurality of event data an the first associated data, generating musical tone in accordance with the event data at timing corresponding to said time represented by the first associated data, returning the additional data block into the additional data to be synchronized with the event data at timing corresponding to said time represented by the second associated data.

26. The musical tone data communication system according to to claim 25, wherein said additional data is wave representing tone.

27. The musical tone data communication apparatus according to claim 25, wherein said additional data is at least one of motion picture, sound and, so as to produce said at least one of motion picture, sound and voice based on the attached associated data.

28. The musical tone data communication system according to claim 25, wherein said additional data is at least one of motion picture, sound and voice to be synchronized with the event data, so as to produce a musical tone based on the event data and said at least one of motion picture, sound and voice based on the additional data in synchronism with said musical tone.

29. A musical tone data communication method, comprising the steps of:

(a) receiving a series of event data generated in sequence, each event data controlling production of musical tone and additional data to be synchronized with the event data;

(b) formatting the performance data into performance data blocks and the additional data into additional data blocks, each block of the performance data blocks and the additional data blocks including associated data which represents time; and (c) transmitting both the performance data blocks and the additional data blocks to a communication network.

30. The musical tone data communication apparatus according to claim 29, wherein said additional data is wave data representing tone.

31. The musical tone data communication method according to claim 29, wherein said additional data is at least one of motion pictures, sound and voice data.

32. The musical tone data communication apparatus according to claim 29, wherein said said additional is at least one motion picture, sound and voice, and said musical tone is produced to by synchronized with the production of at least one motion picture, sound and voice.

33. A musical tone data communication method, comprising the steps of:

(a) receiving performance data block and additional data block on a communication network, the performance data block including one or a plurality of event data generated in sequence and controlling production of musical tone and first associated data which presents time, and the additional data block including additional data to be synchronized with the event data and second associated data which represents time; and (b) returning the performance data block into one or a plurality of event data and the first associate data, generating musical tone in accordance with the event data at timing corresponding to said time represented by the first associated data, returning the additional block into the additional data to be synchronized with the event data at timing corresponding to said time represented by the second associated data.

34. The musical tone data communication method according to claim 3, wherein said additional data is wave data representing tone.

35. The musical tone data communication method according to claim 33, wherein said additional data is at least one of motion picture, sound and, so as to produce said at least one of motion picture, sound and voice based on the attached associated data.

36. The musical tone data communication method according to claim 33, wherein said additional data is at least one of motion picture, sound and voice to be synchronized with the musical control data, so as to produce a musical tone based on the event data and said at least one of motion picture, sound and voice based on the additional data in synchronism with said musical tone.

37. A storage medium storing a program, which a computer executes to realize a musical tone data communication process, comprising the instructions for:

(a) receiving a series of event data generated in sequence, each event data controlling production of musical tone and additional data to be synchronized with the event data;

(b) formatting one or a plurality of the received event data into performance data blocks and the additional data into additional data blocks, each block of the performance data blocks and the additional data blocks including associated data which represents time; and (c) transmitting both the performance data blocks and the additional data blocks to a communication network.

38. The storage medium storing a program according to the claim 37, wherein said additional data is wave data representing time.

39. The storage medium storing a program according to claim 37, wherein said additional data is at least one of motion picture, sound and voice data.

40. The storage medium storing a program according to claim 37, wherein said additional data is at least one of motion picture, sound and voice, and said musical tone is produced to be synchronized with the production of at least one of motion picture, sound and voice.

41. A storage medium storing a program, which a computer executes to realize a musical tone data communication process, comprising the instructions for:

(a) receiving perfomance data block and additional data block on a communication work, the performance data block including one or a plurality of event data generated in sequence and controlling production of musical tone and first associated data which represents time, and the additional data block including data to by synchronized with the event data and second associated data which represents time; and (b) returning the performance data block into one or a plurality of events data and the first associated data, generating musical tone in accordance with the event data at timing corresponding to said time represented by the first associated data, returning the additional data block into the additional data and the second associated data, and reproducing the additional data to by synchronized with the event at timing corresponding to said time represented by the second associated data.

42. The storage medium storing a program according to claim 41, wherein said associated data corresponds to time of production of musical tone.

43. The storage medium storing a program according to claim 42, wherein said time of production is in absolute time.

44. The storage medium storing a program according to claim 41, wherein said performance data is musical control data for controlling production of musical tone.

45. The storage medium storing a program according to claim 41, wherein said additional data is wave data representing time.

46. The storage medium storing a program according to claim 41, wherein said additional data is at least one of motion picture, sound and, so as to produce said at least one of motion picture, sound voice based on the attached associated data.

47. The storage medium storing a program according to claim 41, wherein said performance data is musical control data for controlling production of musical tone, and said additional data is at least one of motion picture, sound and voice to be synchronized with the musical control data, so as to produce a musical tone based on the musical control data and said at least one of motion picture, sound and voice based on the additional data in synchronism with said musical tone.

* * * * *